United States Patent
Novits et al.

(10) Patent No.: US 6,747,099 B1
(45) Date of Patent: Jun. 8, 2004

(54) TACK FREE SURFACE CURES OF POLYMERS BY ORGANIC PEROXIDES IN THE PRESENCE OF AIR

(75) Inventors: Michael F. Novits, Buffalo, NY (US); Leonard H. Palys, Eagle, PA (US); Gary J. Gullo, Barrington, NH (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 178 days.

(21) Appl. No.: 09/869,251

(22) PCT Filed: Nov. 9, 2000

(86) PCT No.: PCT/US00/30953
§ 371 (c)(1), (2), (4) Date: Jun. 26, 2001

(87) PCT Pub. No.: WO01/34680
PCT Pub. Date: May 17, 2001

Related U.S. Application Data

(60) Provisional application No. 60/164,488, filed on Nov. 9, 1999.

(51) Int. Cl.[7] ............................................. C08F 114/00
(52) U.S. Cl. ................. 525/330.9; 525/331.8; 525/331.1; 525/330.4; 525/330.5; 525/332.7; 525/332.6; 525/345; 525/347
(58) Field of Search .................... 525/330.9, 331.8, 525/330.4, 330.5, 331.1, 332.7, 332.6, 345, 347

(56) References Cited

U.S. PATENT DOCUMENTS

| | | | |
|---|---|---|---|
| 4,104,210 A | * | 8/1978 | Coran et al. |
| 4,334,043 A | | 6/1982 | Groepper .................... 525/370 |
| 4,439,388 A | | 3/1984 | Groepper |
| 4,743,656 A | | 5/1988 | Wingrove .................... 525/211 |
| 4,803,250 A | * | 2/1989 | Nagasaki et al. ......... 525/329.3 |
| 4,814,384 A | | 3/1989 | Mitchell et al. ............. 525/211 |
| 4,818,601 A | * | 4/1989 | Itoh et al. .................... 428/297 |
| 4,973,627 A | | 11/1990 | Mitchell ...................... 525/211 |
| 4,983,685 A | * | 1/1991 | Aoshima et al. ........... 525/331.8 |
| 5,143,978 A | * | 9/1992 | Berta .......................... 525/240 |
| 5,684,091 A | * | 11/1997 | Maly et al. ................. 525/332.5 |
| 5,736,615 A | * | 4/1998 | D'Sidocky et al. ........ 525/329.3 |
| 5,916,977 A | * | 6/1999 | Miyagawa et al. ....... 525/333.9 |

FOREIGN PATENT DOCUMENTS

JP   Hei 9(1997)-169873   6/1997

OTHER PUBLICATIONS

Abstract JP 61–014238, 1986.*
Abstract JP 61014238 Jan. 1986.*

* cited by examiner

Primary Examiner—Margaret G. Moore
(74) Attorney, Agent, or Firm—William D. Mitchell

(57) ABSTRACT

Compositions are disclosed which comprise mixtures of at least one compound selected from silicone elastomers, bis-, tri- or higher polymaleimides and/or bis-, tri- or higher polycitraconimides, and at least one compound selected from p-phenylene-diamine based antiozonants, sulfur compounds capable of accelerating sulfur vulcanization of polymers capable of being crosslinked by sulfur and polysulfide polymers which when compounded into polymers curable by free radical initiators in the presence of free radical initiators permit substantially tack free surface cure of the polymers by decomposition of the free radical initiator in the presence of molecular oxygen. Compositions containing the above ingredients and at least one free radical initiator, curable compositions containing the combination and processes for making and using the compositions are also disclosed.

8 Claims, No Drawings

TACK FREE SURFACE CURES OF POLYMERS BY ORGANIC PEROXIDES IN THE PRESENCE OF AIR

This application claims priority from provisional application No. 60/164,488 filed Nov. 9, 1999.

BACKGROUND OF THE INVENTION

This invention relates to compositions of matter classified in the art of chemistry as bis-, tri- and higher poly-maleimides, as bis-, tri- and higher poly-citraconimides, as silicone elastomers, as p-phenylenediamine based antiozonants and as sulfur containing organic compounds which are accelerators for the sulfur curing (crosslinking) of polymers which are curable/crosslinkable by sulfur and also sulfur compounds which are polysulfide polymers. The invention also relates to compositions containing them, to processes for their use and to the products produced by such processes.

Polymers and copolymers crosslinked with free radical initiators, organic peroxides and/or azo initiators, are known to have superior properties, particularly to polymers crosslinked by sulfur cure. These properties include high heat ageing resistance, low compression set, decreased staining of metal or coated metal sheet and easy production of colored products which have color stability during crosslinking and during long periods of use. These properties make use of peroxide cure of great practical importance particularly because crosslinking is through a carbon carbon bond rather than through a sulfur containing linkage and this bonding difference is responsible for the improved heat aging and compression set. The drawback for cure of polymers with free radicals from organic peroxides and azo initiators has always been that if air is not excluded from the surface of the material during cure, a tacky surface due to cure inhibition by the molecular oxygen in the air results.

In order to avoid tacky surfaces on objects fabricated using such free radical crosslinking by organic peroxides and/or azo initiators, it has been conventional to exclude air from contact with the surface during cure to avoid the cure inhibition caused by the presence of the molecular oxygen found in atmospheric air. Measures to exclude molecular oxygen add to the cost and complexity of the cure step and sometimes it is difficult, as in the cases of cure in steam autoclaves and in the interior of hoses, to assure the complete exhaustion of air and its molecular oxygen component. In some cases the manufacturer would like to switch from sulfur to peroxide cure and use existing hot air oven curing chambers. Curing with conventional peroxide systems under these circumstances would not be viable as a tacky surface would result.

In order to simplify and reduce the cost and complexity of the cure step, various methods have been suggested for preventing surface cure inhibition by molecular oxygen during free radical crosslinking. These methods have, for various reasons, met with little or no success in actual practice. In particular, none have provided a tack free surface while providing the most desirable physical property of peroxide (azo) cure; superior compression set at 150° C. for 70 hours, compared to about 100° C., i.e. lower temperature performance for the prior art.

PRIOR ART

U.S. Pat. No. 4,983,685 discloses the use of compounds selected from the following classes: (a) imidazole compounds, (b) thiourea compounds, (c) thiazole compounds, (d) thiuram compounds, (e) dithiocarbamate compounds, (f) phenol compounds, (g) triazole compounds and (h) amine compounds which are accelerators for sulfur vulcanization in the optional presence of antioxidants, anti-ageing compounds and the like for elastomers for reducing surface tack in the peroxide cure of elastomers in the presence of molecular oxygen. Among optional ingredients which are suggested as possible ingredients for inclusion in the formulations, in this case for increased crosslinking, is N,N'-m-phenylene bismaleimide.

This is not the preferred optional coagent as a dimethacrylate compound is actually used in the examples. There is no recognition that this latter bismaleimide compound might provide an enhanced effect on the ability of certain compounds of (a) through (h) to reduce surface tack during free radical cure in the presence of molecular oxygen. The use of the various sulfur is accelerators, in particular with peroxide, does provide tack free or reduced tack surfaces for the cured polymers in this reference but the important physical properties expected from a peroxide cure are also reduced. There is no recognition in U.S. Pat. No. 4,983,685 that if the silicone elastomers, bismaleimides and biscitraconimides of the present invention are used in combination with p-phenylene diamine based antiozonants, sulfur containing sulfur vulcanization accelerators and antioxidants and/or polysulfide polymers in free radical cures of polymers, that tack free surfaces and improved physical properties will result and that of all the crosslinking aids mentioned, only these particular classes of compounds have that effect.

Japanese Published Patent Application No. Hei 9[1997]-169873 discloses that antioxidants of the benzimidazole type and of the polymeric 2,2,4-trimethyl-1,2-dihydroquinoline type used in combination with standard crosslinking aids such as methacrylate esters, triallylcyanurates and maleimides, such as this present invention's preferred component N,N'-m-phenylene bismaleimide, and standard crosslinking peroxides will result in cured peroxide crosslinkable elastomers with a tack free surface in the presence of air. The inclusion of p-phenylene diamine based antiozonants, silicone elastomers, sulfur accelerators of any type and/or polysulfide polymers is not suggested.

U.S. Pat. No. 4,334,043 teaches the use of surface treatment of curable polymer compositions with organo-metallic compounds, inorganic metallic salts, or lanthanides prior to crosslinking with organic peroxide crosslinking initiators in air to prevent surface tack after crosslinking. Other means of controlling surface tack are not mentioned except for the previously known techniques for surface tack free curing by simply excluding air contact with the rubber surface.

U.S. Pat. Nos. 4,814,384 and 4,973,627 disclose cures of rubber blends for tire treads and sidewalls using a combination of sulfur and peroxide cures. Sulfur accelerators are also employed. Coagents of any type are not mentioned, nor is cure in the presence of air discussed. The use of elemental sulfur is required in the practice of these inventions. We have found, however, that the use of elemental sulfur adversely affects the final physical properties of the cured elastomer to the point where they are more typical of sulfur cure than peroxide cure.

U.S. Pat. No. 4,743,656 also discloses a mixed sulfur/peroxide cure agent for elastomers, which cure agent also includes sulfur accelerators as well as elemental sulfur and the peroxide. Coagents are not mentioned, nor are crosslinking in air and surface tackiness discussed.

U.S. Pat. No. 4,575,552 claims the use of specific combinations of hindered phenol antioxidants, metal salts of dithiocarbamates and m-phenylene-dimaleimide to provide a peroxide crosslinked polymer with superior hydrolytic and thermal stability for geothermal applications. There is no mention of crosslinking in the presence of air, air-inhibition or surface tackiness as a result of air-inhibition.

U.S. Pat. No. 5,849,214 discloses the use of sulfur compounds, sulfur accelerators and hydroquinones with the optional presence of crosslinking aids (coagents) in the retardation of scorch during compounding of free radical crosslinkable polymers in the presence of free radical initiators. Bismaleimides, and biscitraconimides are not specifically discussed nor is there any mention of the possible effect on surface tackiness during cure in the presence of molecular oxygen (air) for any of the compositions disclosed.

In addition there are patents which use various compounds to physically coat the surface of crosslinkable elastomers to exclude air (oxygen) e.g., U.S. Pat. No. 4,439,388 which teaches use of boric acid, boric acid anhydride as a surface treatment prior hot air cure. This surface coating technique is labor intensive as it must be removed and disposed of after the crosslinking reaction step is completed.

None of the above references, taken singly or in combination, suggests applicants' solution described and claimed herein for elimination of surface tack due to air-inhibition during free radical cure of polymers by free radical curing agents, such as organic peroxides and azo initiators while providing the desirable physical properties of a peroxide (azo) cure. For example, the compression set values expected from a standard peroxide cure and wherein the compression set is measured at temperatures in the region about 150° C. for 70 hours.

SUMMARY OF THE INVENTION

The invention provides in its first composition aspect, a composition comprising:

a) At least one compound (A) selected from the group consisting of silicone elastomers and a compound having the formula (I):

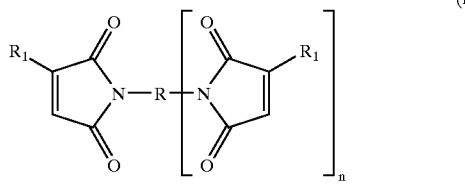

(I)

wherein n is 1, or 2 and R is divalent, or trivalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms and alkyl aromatic groups having from about 7 to 24 carbon atoms, and wherein those divalent, or trivalent groups may contain one or more heteroatoms selected from O, N and S, replacing a carbon atom, or atoms, and each $R_1$ is identical and is hydrogen or an alkyl group of 1 to 18 carbon atoms; and (b) at least one compound (B) selected from the group consisting of p-phenylenediamine based antiozonants and sulfur containing organic compounds selected from the group consisting of sulfur containing organic compounds capable of accelerating sulfur vulcanization of polymers capable of being crosslinked by sulfur ("sulfur accelerators"), polysulfide polymers and mixtures of said sulfur containing compounds.

The tangible embodiments of the first composition aspect of the invention possess the inherent applied use characteristic of being suppressors of surface inhibition of free radical induced cure of polymers in the presence of gaseous molecular oxygen, (i.e., oxygen present in the atmosphere) thereby permitting tack free cures of polymers by free radical curing agents in the presence of air while maintaining the final physical properties associated with a conventional peroxide cure.

The invention provides in a subgeneric aspect of the first composition aspect of the invention, a composition formed by mixing as the essential ingredients thereof at least one member of compound (A) and at least one member of compound (B) of the first composition aspect of the invention.

The invention provides in a second composition aspect, a composition comprising a composition as defined in the first composition aspect and a free radical initiator selected from the group consisting of organic peroxides and azo initiators.

The tangible embodiments of the second composition aspect of the invention possess the inherent applied use characteristic of being curing or crosslinking agents for those polymers capable of being crosslinked by free radical initiators and of being capable of effecting such cures in the presence of air (molecular oxygen) without the polymer being cured experiencing surface inhibition by the presence of air (molecular oxygen), thus, providing a cured or crosslinked polymer having a substantially tack free surface without the necessity for avoiding contact of said surface with air (molecular oxygen) during cure.

The invention provides a subgeneric aspect of the second composition aspect of the invention. Said composition being one prepared by mixing in any order, at least one member of compound (A) and at least one member of compound (B) of the first composition aspect of the invention and a free radical initiator as defined for the second composition aspect of the invention.

The invention provides in a third composition aspect a curable composition comprising a polymer curable by free radical initiators and a composition as defined in the second composition aspect of the invention.

The third composition aspect of the invention possesses the inherent applied use characteristic of being formable into a shaped article and then being crosslinkable while the surface of said shaped article is in contact with air (molecular oxygen) to provide a crosslinked shaped article having a substantially tack free surface.

The invention provides in a subgeneric composition aspect of the third composition aspect of the invention a curable composition prepared by mixing in any order at least one member of compound (A) and at least one member of compound (B) of the first composition aspect of the invention, a free radical initiator as defined for the second composition aspect of the invention and a polymer crosslinkable by a free radical initiator.

The invention provides in a first process aspect a process for the preparation of the second composition aspect of the invention which comprises mixing in any order at least one member of compound (A) and at least one member of compound (B) of the first composition aspect of the invention and a free radical initiator as defined in the second composition aspect of the invention.

The invention provides in a second process aspect of the invention, a process for the preparation of the third composition aspect of the invention which comprises mixing in any order at least one member of compound (A) and at least one member of compound (B) of the first composition aspect of the invention, a free radical initiator as defined in the second composition aspect of the invention and a polymer crosslinkable by a free radical initiator.

Special mention is made of embodiments of the several aspects of the invention wherein compound (A) is selected from bismaleimides and compound (B) is selected from sulfur accelerators, where compound (A) is selected from biscitraconimides and compound (B) is selected from sulfur accelerators, where compound (A) is selected from bismaleimides and compound (B) is selected from polysulfide polymers, where compound (A) is selected from biscitraconimides and compound (B) is selected from polysulfide polymers, where compound (A) is selected from silicone elastomers and compound (B) is selected from polysulfide polymers.

Special mention is also made of embodiments of the several aspects of the invention wherein chlorinated polyethylene and/or chlorosulfonated polyethylene are included as optional supplemental ingredients in addition to compounds (A) and (B).

DETAILED DESCRIPTION

The best mode contemplated by the inventors for making and using their invention will now be described in detail with reference to a particular embodiment thereof, namely:

A mixture of dipentamethylene thiuram tetra-sulfide (Sulfads), N,N'-m-phenylene bismaleimide (HVA-2) and 1,1-di(t-butylperoxy)-3,3,5-trimethylcyclohexane (LUPEROX® 231 XL) used to cure ethylene propylene copolymer (VISTALON® 504) in hot air.

To prepare the mixture of Sulfads, HVA-2 and LUPEROX 231 XL, the ingredients, which are all in dry powder form (the LUPEROX® 231 XL is in the form of 40% by weight peroxide dispersed on calcium carbonate), may be mixed in any order and then compounded by standard methods (Banbury, two roll mill, extruder and the like) into the VISTALON® polymer. The Sulfads®, HVA-2 and LUPEROX 231 XL may also be compounded directly into the VISTALON either simultaneously or sequentially in any order. Any two of the Sulfads, HVA-2 and LUPEROX 231 XL ingredients may be mixed and compounded into the VISTALON separately or simultaneously with the third ingredient. This compounding, if done separately, may also be performed in any order of s ingredient addition to the polymer, but it is preferred if the peroxide is added last.

Once compounding with the VISTALON is complete, the compounded mixture may be cured simply by placing it in a hot air oven at a suitable temperature for initiating cure by decomposition of the peroxide, conveniently, in this case, at about 365° F. (about 185° C.), for a sufficient period of time to permit the desired degree of crosslinking to take place, conveniently, in this case, about minutes, for a thin sample at room temperature at the start.

One of skill in the art will recognize that the other compounds falling within the scope of Formula I of the first composition aspect of this invention are all solid materials, are all trimaleimides, bismaleimides, tricitraconimides, or bis citraconimides and can all be combined with the other starting materials contemplated by the invention by similar conventional methods to those described. The bismaleimides and biscitraconimides contemplated as starting materials are all either commercially available or can be readily synthesized by methods well known in the art. See, for example, U.S. Pat. No. 5,494,948; 5,616,666, 5,292,815 and the references cited therein for more general synthetic methods.

The trimaleimides and tricitraconimides as well as the higher polymaleimides and citraconimides may be prepared by analogous techniques if they are not commercially available. For example, the trimaleimide, N,N',N''-(1,3,5-triazine-2,4,6-triyl)trimaleimide has CAS number CAS (67460-81-5).

Some primary amines suitable for synthesis of the di, tri- and higher polymaleimides and analogous citraconimides are polyfunctional primary amines such as melamine and the various polyoxypropylene amines such as the polyoxypropylene diamines and the polyoxypropylene triamines sold under the JEFFAMINE tradename by Huntsman Corporation.

In addition to the N,N'-m-phenylene-bismaleimide specifically referenced above, other bismaleimides, in addition to those disclosed in the above referenced patents, suitable for use in the invention, without limiting the generality of the above general formula (I), are:

N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxy-dipropylene)bismaleimide, N,N'-(aminodipropylene)bismaleimide, N,N'-(ethylenedioxy-dipropylene)bismaleimide, N,N'(1,4-cyclohexylene)bismaleimide, N,N'-(1,3-cyclohexylene)bismaleimide, N,N'-(methylene 1,4-dicyclohexylene)bismaleimide, N,N'-(isopropylidene-1,4-dicyclohexylene)bismaleimide, N,N'-(oxy-1,4-dicyclohexylene)bismaleimide, N,N'-p-(phenylene)bismaleimide, N,N'-(o-phenylene)bismaleimide, N,N'-(1,3-naphthylene)bismaleimide, N,N'-(1,4-naphthylene)bismaleimide, N,N'(1,5-naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-2,6-pyridyl)bismaleimide, N,N'-(1,4-anthraquinonediyl)bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)bismaleimide, N,N'-(5-hydroxy-1,3-phenylene)bismaleimide, N,N'-(5-methoxy-1,3-phenylene)bismaleimide, N,N'-(m-xylylene)bismaleimide, N,N'-(p-xylylene)bismaleimide, N,N'-(methylenedi-p-phenylene)bismaleimide, N,N'-(isopropylidenedi-p-phenylene)bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene)bismaleimide, N,N'-(carbonyldi-p-phenylene)bismaleimide, α,α-bis-(4-maleimodophenyl)-meta-diisopropylbenzene, α,α-bis-(4-p-phenylene)bismaleimide and α,α-bis-(4-maleimidophenyl)para-diisopropylbenzene.

Combination of two or more bismaleimides, or bismaleimides with the trimaleimides, and with the higher polymaleimides in the compositions and processes of the invention are also contemplated as equivalents and one of skill in the art would understand that such tri and higher polymaleimides and their substitution for the compounds and processes specifically illustrated herein for the practice of the invention to be such equivalents and to be well within the scope contemplated by the invention.

Biscitraconimides, which may be substituted in whole or in part for the N,N'-m-phenylenebismaleimide referenced above include as representative examples:

1,2-N,N'-dimethylene biscitraconimide;
1,2-N,N'-trimethylene biscitraconimide;

1,5-N,N'-2-methyl-pentamethylene)-biscitraconimide; and

N,N'-methylphenylene biscitraconimide.

Mixtures of biscitraconimides and mixtures of bismaleimides and biscitraconimides as well as those including the trimaleimides are also contemplated as equivalents by the invention.

The biscitraconimides contemplated by the invention are all well known compounds and where not commercially available, they may be readily synthesized by methods detailed in the art. U.S. Pat. No. 5,292,815 in column 4, provides a detailed list of such methods. As stated above, the tri- and higher polycitraconimides may be prepared by analogous methods and substituted in whole or in part in the compositions of the invention and such compounds and substitutions will be understood by one of skill in the art as being a full equivalent to those specifically illustrated herein and well within the scope contemplated as equivalent by the invention.

The silicone elastomers contemplated as useful in the aspects of the invention are the peroxide crosslinkable dimethyl vinyl substituted silicone derivative elastomers which are well known in the art. See, for example, "Kirk Othmer Encyclopedia of Chemical Technology", Vol. 20, pp. 943 et seq., John Wiley & Sons, © 1982.

Sulfur containing organic compounds capable of accelerating sulfur vulcanization of polymers, which are capable of being crosslinked by sulfur contemplated for use in the invention are well known in the art. Many different classes of these compounds are known and all are contemplated as equivalent.

*The Vanderbilt Rubber Handbook*, thirteenth edition, 1990, R.T. Vanderbilt Company, Inc., publisher lists many types. Illustrative of these are derivatives of benzothiazoles, thiadiazoles, sulfenamides, sulfenimides, dithiocarbamates, thiurams, imidazoles, xanthates, and thioureas. Also included in this general class of sulfur compound sulfur accelerators are sulfides, disulfides (e.g., diallyldisulfide) polysulfides and arylpolysulfide compounds such as the amylphenol polysulfides e.g. VULTAC® products from ATOFINA Chemicals, Inc. and other sulfides such as disulfide and/or other known sulfur accelerating polysulfide phosphate, dithiophosphates and/or phosphorous and sulfur containing compounds. Other sulfur containing organic compounds capable of sulfur donation at vulcanization temperatures which are known but are not presently used for such reactions because of cost concerns are also contemplated as equivalents. Illustrative of these is the compound 2-(2,4-cyclopentadiene-1-ylidene)-1,3-dithiolane.

More particularly, one sulfur accelerator class suitable for use in the practice of the invention are salts of disubstituted dithiocarbamic acid.

These salts have the general structure:

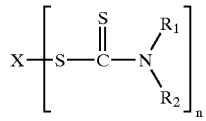

Wherein X is an ion derived from a metal selected from the group consisting of nickel, cobalt, iron, chromium, tin, zinc, copper, lead, bismuth, cadmium, selenium and tellurium, or X is a quaternary ammonium ion, n may vary from 1 to 6 and is equal to the number of formal positive charges on the X ion, and $R_1$ and $R_2$ are independently alkyl of 1 to 7 carbon atoms.

Examples of the salts of disubstituted dithiocarbamic acid are:

bismuth dimethyldithiocarbamate;
cadmium diethyldithiocarbamate;
cadmium diamyldithiocarbamate;
copper dimethyldithiocarbamate;
lead diamyldithiocarbamate;
lead dimethyldithiocarbamate;
selenium diethyldithiocarbamate;
selenium dimethyldithiocarbamate;
tellurium diethyldithiocarbamate;
piperidinium pentamethylene dithiocarbamate;
zinc diamyldithiocarbamate;
zinc diisobutyldithiocarbamate
zinc diethyldithiocarbamate;
zinc dimethyldithiocarbamate;
copper dibutyldithiocarbamate;
sodium dimethyldithiocarbamate;
sodium diethyldithiocarbamate;
sodium dibutyldithiocarbamate;
zinc di-n-butyldithiocarbamate;
zinc dibenzyldithiocarbamate.

A second sulfur accelerator class suitable for use in the invention comprises the thiurams. These are prepared from secondary amines and carbon disulfide and possess the general structure:

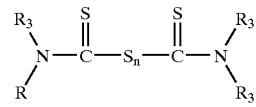

Wherein $R_3$ is an alkyl group of from 1 to about 7 carbon atoms or the $R_3$ groups on each particular nitrogen atom may be concatenated to form, together with the nitrogen atom on which they are attached, a five, six or seven membered heterocyclic ring containing 4, 5 or 6 carbon atoms respectively and n may have a positive value from greater than zero up to 6.

Typical examples of thiuram sulfur accelerators are:

dipentamethylenethiuram tetrasulfide and hexasulfide;
tetrabutylthiuram disulfide;
tetramethylthiuram disulfide;
tetraethylthiuram disulfide;
tetramethylthiuram monosulfide;
isobutylthiuram disulfide;
dibenzylthiuram disulfide;
tetrabenzylthiuram disulfide;
tetraisobutylthiuram disulfide;
isobutylthiuram monosulfide;
dibenzylthiuram monosulfide;
tetrabenzylthiuram monosulfide;
tetraisobutylthiuram monosulfide.

The higher multisulfides of the various thiurams are also sulfur donors.

Derivatives of thiadiazoles are, but not limited to, monobenzoyl derivatives of dimercaptothiadiazole (2,5-dimethyl-1,3,4-thiadiazole); the proprietary thiadiazole of the Vanderbilt Rubber Company identified as VANAX® 189; 1,2,4-thiadiazole, 5-ethoxy-3-(trichloromethyl)

thiadiazole; and alkyl mercaptothiadiazoles, e.g. methyl mercapto thiadiazole.

Derivatives of benzothiazoles have the general structure:

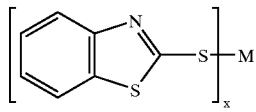

Wherein M is a direct bond between two sulfur atoms, H, or an ion derived from a metal selected from the group consisting of nickel, cobalt, iron, chromium, tin, zinc, copper, lead, bismuth, cadmium, selenium and tellurium; and when M is H, x is 1; when M is a direct bond between two sulfur atoms, x is 1 or 2; and when M is an ion derived from a metal, x is equal to the formal valence of the metal ion; and if M is a direct bond between two sulfur atoms and x is 1, then the second sulfur atom to which the M bond is attached is also bonded to a 4-morpholinyl radical.

Illustrative compounds are: 2-(4-morpholinodithio) benzothiazole; benzothiazyl disulfide; 2-mercaptobenzothiazole; 2-mercaptobenzothiazole disulfide; sodium-2-mercaptobenzothiazolate; zinc-2-mercaptobenzothiazole; copper-2-mercaptobenzothiazolate; 2-N-cyclohexylaminobenzothiazole; N-cyclohexylamino-2-benzothiazole polysulfide; 2-bisbenzothiazole-2,2-polysulfide and 2-bisbenzothiazole-2,2-disulfide; bis(2,2'-benzothiazyldisulfide).

The sulfenamide accelerators are also well known. Illustrative examples are: N-oxydiethylene-2-benzothiazole sulfenamide; N-oxydiethylene thiocarbamyl-N-oxydiethylene sulfenamide; N-cyclohexyl-2-benzothiazole sulfenamide; N-t-butyl-2-benzothiazole sulfenamide; N-cyclohexyl-2-benzothiazylsulfeneamide; N,N-dicyclohexyl benzthiazyl sulfenamide; N-t-butyl-2-benzothiazole sulfenamide. There are also sulfenimide compounds, e.g., N-t-butyl-benzothiazole-2-sulfenimide.

Typical imidazoles are: 2-mercaptobenzimidazole, 2-mercaptomethylbenzimidazole; and the zinc salt of 2-mercaptobenzimidazole.

Zinc isopropyl xanthate is a typical xanthate sulfur accelerator.

Typical thioureas are: trimethylthiourea; 1,3-diethylthiourea and 1,3-dibutylthiourea; ethylene thiourea; blend of dialkyl thioureas; diphenyl thiourea; diorthotolyl thiourea; dimethyl thiourea; diethyl thiourea; dibutyl thiourea.

Alkylphenoldisulfide types of sulfur accelerators are illustrated by the compounds available from ATOFINA Chemicals, Inc., under the designation VULTAC® 2, VULTAC 3 and VULTAC 5.

Thiophosphate sulfur accelerators are illustrated by such compounds as copper dialkyldithiophosphate; zinc dialkyldithiophosphate; zinc amine dithiophosphate; zinc dibutyldithophosphate; copper O,O-diisopropylphosphorodithiolate; zinc O,O-diisopropylphosphorodithiolate.

Other miscellaneous sulfur accelerators include 4,4-dithiodimorpholine; N,N'-caprolactam disulfide; dibutylxanthogen disulfide.

The polymers which can be cured (crosslinked) in the presence of molecular oxygen include all those natural and synthetic polymers capable of being crosslinked either by abstraction of hydrogen (or other extractable atoms, such as with iodo and bromo substituted fluoroelastomers) or by polymerization through double bonds.

Polymers which are currently understood to not be crosslinkable by these mechanisms and which undergo degradation in the presence of free radicals generated from organic peroxides and the azo initiators defined herein below and whose presence should be substantially avoided in the curable compositions of this invention include: poly(vinyl chloride), poly-(propylene), butyl rubber, epichlorohydrin polymers and epichlorohydrin ethylene oxide polymers. When used herein and in the appended claims when referring to polymers suitable for use in connection with the invention any reference to a group of polymers using the terms "comprising," "consisting essentially" and "consisting of" expressly excludes more than minor insignificant amounts (1% by weight or less) of the non free radical crosslinkable polymers in the absence of an express statement to the contrary.

Polymers crosslinkable by free radicals from organic peroxides and azo initiators as defined herein below include ethylene-propylene terpolymer (EPDM), ethylene-propylene copolymer (EPM) natural polyisoprene rubber (NR), styrene butadiene rubber (SBR), polybutadiene rubber (BR), synthetic polyisoprene rubber (IR), poly(ethylene) (PE), ethylene-vinyl acetate (EVA), acrylonitrile-butadiene-styrene (ABS), unsaturated polyester, styrene-butadiene-styrene block copolymers (SBS), styrene-isoprenestyrene block copolymers (SIS), neoprene rubber (CR), nitrite rubber (NBR), polysulfide rubber (T) chlorinated polyethylene) (CM), polyurethane (AU, EU), vinylidene fluoride copolymers (CFM), silicone rubber (PMQ), vinyl silicone rubber (VMQ, PVMQ), polyacrylate (ACM), chlorosulfonated poly(ethylene) (CSM) and fluorosilicone rubber (FVMQ).

The free radical initiators (organic peroxides and azo initiators) suitable for use in the invention include all those classes of organic peroxides and azo initiators suitable for curing (crosslinking) polymers, both thermoplastics and elastomers.

The azo initiators are those known in the art, such as 2,2'-azobis-(2-acetoxypropane), to generate free radicals on heat decomposition capable of inducing the desired curing (crosslinking) reaction. The azo initiators of U.S. Pat. Nos. 3,862,107 and 4,129,531, the disclosures of which are incorporated herein by reference, are also suitable.

With the exception of hydroperoxides and liquid peroxydicarbonates, all those organic peroxides known to undergo decomposition by heat to generate radicals capable of initiating the desired curing (crosslinking) reactions are contemplated as suitable for use in the invention. Dialkyl peroxides, diperoxyketals, mono-peroxy carbonates, cyclic ketone peroxides, diacyl peroxides, organosulfonyl peroxides, peroxyesters and solid, room temperature stable peroxydicarbonates are the preferred initiators. The most preferred initiators are dialkyl peroxides, peroxyketals, cyclic ketone peroxides and diacyl peroxides.

A good reference which provides important peroxide names and physical properties for all these classes of organic peroxides can be found in "*Organic Peroxides*" by Jose Sanchez and Terry N. Myers; Kirk-Othmer Encyclopedia of Chemical Technology, Fourth Ed., Volume 18, (1996).

Illustrative dialkyl peroxide initiators are:
di-t-butyl peroxide;
t-butyl cumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;

4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di[(t-butylperoxy)isopropyl]benzene;
1,3,5-tris(t-butylperoxyisopropyl)benzene;
1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
t-amyl cumyl peroxide;
2,4,6-tri(butylperoxy)-s-triazine;
1,3,5-tri[1-(t-butylperoxy)-1-methylethyl]benzene
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Illustrative solid, room temperature stable peroxydicarbonates are, but not limited to:

di(2-phenoxyethyl)peroxydicarbonate; di(4-t-butylcyclohexyl)peroxydicarbonate; dimyristyl peroxydicarbonate; dibenzyl peroxydicarbonate; di(isobornyl) peroxydicarbonate.

Another preferred class of dialkylperoxides which may be used singly or in combination with the other free radical initiators contemplated by the invention are those selected from the group represented by the formula:

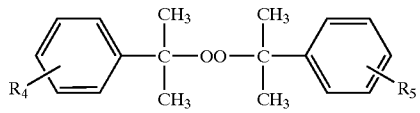

Wherein $R_4$ and $R_5$ may independently be in the meta or para positions and are the same or different and are selected from the group hydrogen or straight or branched chain alkyl of from 1 to 6 carbon atoms. Dicumyl peroxide and isopropylcumyl cumyl peroxide are illustrative.

Other dialkyl peroxides are:

3-cumylperoxy-1,3-dimethylbutyl methacrylate;
3-t-butylperoxy-1,3-dimethylbutyl methacrylate;
3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3(1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators are:

1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Other peroxides falling within the general class defined as useful in the invention include benzoyl peroxide, 00-t-butyl-0-hydrogen-monoperoxy-succinate and 00-t-amyl-0-hydrogen-monoperoxy-succinate.

Illustrative cyclic ketone peroxides are compounds having the general formulae (II), (III) and/or (IV).

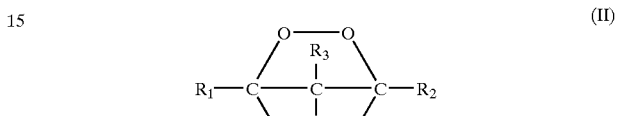

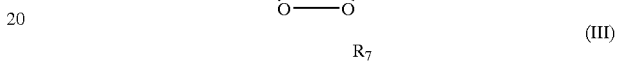

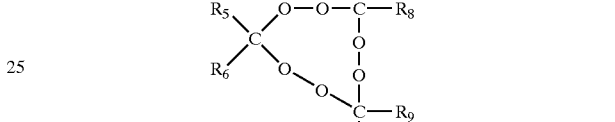

Wherein $R_1$ to $R_{10}$ are independently selected from the group consisting of hydrogen, $C_1$ to $C_{20}$ alkyl, $C_3$ to $C_{20}$ cycloalkyl, $C_6$ to $C_{20}$ aryl, $C_7$ to $C_{20}$ aralkyl and $C_7$ to $C_{20}$ alkaryl, which groups may include linear or branched alkyl properties and each of $R_1$ to $R_{10}$ may be substituted with one or more groups selected from hydroxy, $C_1$ to $C_{20}$ alkoxy, linear or branched $C_1$ to $C_{20}$ alkyl, $C_6$ to $C_{20}$ aryloxy, halogen, ester, carboxy, nitride and amido, preferably, at least 20% of the total active oxygen content of the peroxide mixture used for a crosslinking reaction will be from compounds having formulas (II), (III) and/or (IV).

Some examples of suitable cyclic ketone peroxides are:

3,6,9, triethyl-3,6,9-trimethyl-1,4,7-triperoxynonane (or methyl ethyl ketone peroxide cyclic trimer) and methyl ethyl ketone peroxide cyclic dimer,
3,3,6,6,9,9-hexamethyl-1,2,4,5-tetraoxacyclononane;

Illustrative suitable peroxy esters are:

2,5-dimethyl-2,5-di(benzoylperoxy)hexane;
t-butylperbenzoate;
t-butylperoxy acetate;
t-butylperoxy-2-ethyl hexanoate;
t-amyl perbenzoate;
t-amyl peroxy acetate;
t-butyl peroxy isobutyrate;
3-hydroxy-1,1-dimethyl t-butyl peroxy-2-ethyl hexanoate;
00-t-amyl-0-hydrogen-monoperoxy succinate;
00-t-butyl-0-hydrogenmonoperoxy succinate;
di-t-butyl diperoxyphthalate;
t-butylperoxy (3,3,5-trimethylhexanoate);

1,4-bis(t-butylperoxycarbo)cyclohexane;

t-butylperoxy-3,5,5-trimethylhexanoate;

t-butyl-peroxy-(cis-3-carboxy)propionate;

allyl 3-methyl-3-t-butylperoxy butyrate.

Illustrative monoperoxy carbonates are:

00-t-butyl-0-isopropylmonoperoxy carbonate;

00-t-butyl-0-(2-ethyl hexyl)monoperoxy carbonate;

1,1,1-tris[2-(t-butylperoxy-carbonyloxy)ethoxymethyl] propane;

1,1,1-tris[2-(t-amylperoxy-carbonyloxy)ethoxymethyl] propane;

1,1,1-tris[2-(cumylperoxy-cabonyloxy)ethoxymethyl] propane;

OO-t-amyl-O-isopropylmonoperoxy carbonate.

Illustrative diacyl peroxides are:

di(4-methylbenzoyl)peroxide;

di(3-methylbenzoyl)peroxide;

di(2-methylbenzoyl)peroxide;

didecanoyl peroxide; dilauroyl peroxide;

2,4-dibromo-benzoyl peroxide;

succinic acid peroxide.

dibenzoyl peroxide;

di(2,4-dichloro-benzoyl)peroxide.

Imido peroxides of the type described in PCT Application publication WO9703961 A1 6 Feb. 1997 are also contemplated as suitable for use by the invention.

One of skill in the art will readily be able to select suitable quantities of the various ingredients for use in the invention and will quickly and easily be able to optimize the concentrations through a series of bench scale trials employing increasing amounts of the ingredients in samples of the polymer to be cured (crosslinked). The optimum processing (compounding) time and temperatures and the like may also be determined from the same trials as will the optimum cure time and temperature.

Typically, one will employ the compounds of formula (a) (the bismaleimide and biscitraconimides) in the composition of the invention in quantities which will provide from about 0.2 parts by weight per part of polymer by weight (phr) to about 10.0 phr, preferably from about 1.0 phr to about 5.0 phr, most preferably from about 1.5 phr to about 3.0 phr.

Typically, one will employ the sulfur containing organic compound capable of accelerating sulfur vulcanization in polymers capable of being crosslinked by sulfur in compositions of the invention in quantities which will provide from about 0.01 phr to about 20 phr, preferably from about 0.1 phr to about 1.0 phr, most preferably from about 0.1 phr to about 0.5 phr. It is understood by those of skill in the art that these compounds are of two types. Those that donate sulfur to the vulcanization and those which simply accelerate sulfur vulcanization. Either class of compound or mixtures thereof are contemplated as equivalents by the invention.

Alkyl phenol disulfide polymers of the VULTAC® type are preferably used at from about 0.5 phr to 20 phr when used alone or at from about 0.1 phr to about 10 phr when in combination with other sulfur accelerators.

Typically, one will employ the free radical initiator (organic peroxide and/or azo initiator) in quantities of from about 0.04 to about 10 phr preferably from about 1 to about 4 phr.

The time-temperature conditions necessary for curing largely depend on the structure of the free radical curing agent. For the azo initiators, suitable conditions are detailed in U.S. Pat. No. 3,632,107 and 4,129,531.

For the compositions of the invention, appropriate time and temperature conditions may be determined for crosslinking a particular polymer composition by running a small number of well controlled rheometer studies and selecting values from the results of those studies where the time/temperature relationship is from five to fifteen times the half life value for the free radical initiator in the system.

The invention contemplates that other conventional additives such as anti-oxidants (hindered phenols and polymeric quinoline derivatives are preferred), aliphatic process oils, and other process aids, pigments, dyes, tackifiers, waxes, reinforcing aids, UV stabilization agents, blowing agents and activators and antiozonants may also be present in the compositions before, after and during the curing step.

The polysulfide polymers contemplated by the invention are those known polysulfide polymers which are prepared by the reaction of an α,ω-dihaloalkyl (or dihaloheteroalkyl) compound with a metallic, preferably an alkali metal, polysulfide. The common commercially available polysulfide polymers are either liquids or solids, are either thiol or hydroxy terminated and are derived from materials produce by the reaction of 1,2-dichloroethane, 2,2'dichloro diethyl ether or bis(2-chloroethyl)formal with an alkali metal polysulfide ($MSx_x$) wherein M is an alkali metal ion, preferably derived from sodium and x is a number greater than 1 up to about six.

The invention contemplates that polysulfide polymers may be used in place of or in admixture with the other compounds (B) in equal quantities to those previously specified for those compounds. Since an excess of polysulfide polymer is not contemplated as detrimental to the practice of the invention, it is also contemplated that they may be preblended with the compound(s) (A) and optionally with the free radical initiator(s) to form masterbatches, either solid or liquid. The polysulfide polymers may also be preblended into the polymer to be cured and and the compound(s) (A) and also the free radical initiator(s) blended in simultaneously or subsequently at the option of the operator. Use of the polysulfide polymers in combination with the other sulfur accelerators contemplated by the invention permits reduction of the amount of sulfur accelerator required by the invention.

Similarly it will be obvious to one of skill in the art that polysulfide polymers themselves may be cured to tack free surfaces with free radical initiators in the presence of molecular oxygen if a compound (A) is present in the curable composition even if another compound (B) is not present. Thus, the invention contemplates such a curable composition as an equivalent to the second composition aspect of the invention as defined above.

Certain crosslinkable elastomer compositions which are highly filled with oil and/or carbon black (commonly referred to as highly extended elastomer formulations) are normally cured using sulfur vulcanization rather than free radical initiators. Free radical cure is more difficult because the radicals generated lack specificity and react with the filler and oil as well as the elastomer. This reduces efficiency of the free radical initiator.

It has been found that the use of chlorinated polyethylene and/or chlorosulfonated polyethylene as supplemental ingredients to all the compositions of the various composition aspects of the invention surprisingly increases free radical cure efficiency in highly extended elastomer formulations and allows free radical cure of the systems with reduced or no surface tack. The amount of chlorinated and/or chlorosulfonated polyethylene as supplemental ingredients in the compositions of the first composition aspect of the invention may be from about 1% to about 50% by weight, preferably 15% to 40% by weight and more preferably from 20% to 35% by weight.

The inclusion of these two polymers as supplemental ingredients in some cases has been found to permit use of lower concentrations of the compositions of the first composition aspect of the invention in formulation of the compositions of the second composition aspect of the invention.

The following examples further illustrate the best mode contemplated by the inventors for the practice of their invention and are to be construed as illustrative and not in limitation thereof.

EXAMPLES

Example 1

Evaluation of Prior Art Compositions for Crosslinking EPM in the Presence of Air and Their Effect on Surface Tack and Level of Crosslinking In the example, various known co-curing agents, e.g., unsaturated monomeric crosslinking coagents, elemental sulfur, or sulfur donor compounds, were evaluated in a cure with an organic peroxide. The elastomer used in this example was an ethylene propylene copolymer (EPM) marketed by Exxon, VISTALON® 504. Prior art (U.S. Pat. No. 4,983,685) claims that use of high levels (2.5 to 20 parts) of specific sulfur containing compounds with or without optional unsaturated monomers can be used to crosslink elastomers with peroxide in the presence of air and produce a non-tacky surface. Other references employ sulfur. In this example, low levels of sulfur or sulfur donor compounds were evaluated alone or with some monomeric coagents. The data in Table 1 shows these formulations produced a sticky surface, but also provided a crosslinked product with good physical properties (higher $M_H$ torque). A blend (as taught by the prior art) of an optional monomeric coagent, a high level of sulfur compound and peroxide was also evaluated. This produced a non tacky surface when crosslinking elastomers in the presence of air, however, the physical properties were unacceptable compared to a conventional peroxide monomeric crosslinking formulation.

In the formulation of Table 1, a standard carbon black formulation was used. Carbon black (N774), Sunpar® LW150 process oil from sun, zinc oxide, an antioxidant (AgeRite MA) were compounded into the EPM. In addition, all formulations included 8 parts of a 40% assay organic peroxyketal peroxide, LUPEROX® 231XL [40%/1,1-di (butylperoxy)-3,3,5-trimethylcyclohexane] dispersed on calcium carbonate, marketed by ATOFINA Chemicals, Inc. The level of crosslinking was determined using a Flexsys MDR® 2000E moving die rheometer. Samples were also cured in hot air at 365° F. for ten minutes and judged for surface tackiness by placing a paper towel on the surface, immediately after removal from the oven using moderate and consistent pressure. Surface tack was rated from 1–10, where 1 is considered non-tacky and 10 is very tacky.

A combination of peroxide and a low level of elemental sulfur, 0.3 parts (a typical EPM cure), (Table 1, run #1) provided a good level of crosslinking based on the $M_H$ but a sticky surface when cured in hot air. Use of 2 parts HVA-2 (N,N'-phenylene bismaleimide, marketed by Dupont) coagent together with peroxide (Table 1, run #2) provides an expected improved level of crosslinking (based on $M_H$), but the surface tackiness is, unfortunately, poor. Note: in each case, 1 part of an antioxidant, AgeRite MA (a polymerized quinoline marketed by R.T. Vanderbilt), is used, a standard level which does not affect the surface. A combination of 0.3 parts elemental sulfur and 2 parts of HVA-2 (Table 1, run #5) provides further improvement in the level of crosslinking, (compared to run #2 using HVA-2 alone), but, unfortunately, provides high surface tackiness (7 out of 10). Thus, blends of coagent with low levels of elemental sulfur can improve crosslinking, but not surface tackiness. Prior art teaches 2.5 to 20 parts of sulfur accelerator or its equivalent is required. The use of the coagent HVA-2 and peroxide in the carbon black EPM formulation containing oil and antioxidant provided good crosslinking, but, unfortunately, also produced a sticky surface when curing in hot air. Using 4 parts of monomeric coagent SR-350® together with 0.3 parts of elemental sulfur provided the highest level of crosslinking, but poor surface tackiness (see Table 1, run #4). SR-350 is trimethylolpropanetrimethacrylate, marketed by Sartomer.

Table 1, run #3, 1.2 parts of Sulfads® in combination with peroxide, provided an unacceptable surface tackiness of 6 out of 10, and an undesirable level of cure based on $M_H$. Sulfads is 98% dipentamethylene thiuram tetrasulfide, marketed by R. T. Vanderbilt; thus, the amount of dipentamethylene thiuram tetrasulfide actually added was 1.2×0.98—1.18 parts. Finally, using 1.2 parts of Sulfads in combination with 2 parts HVA-2 and peroxide results in a good surface when cured in the presence of air, unfortunately, the desired crosslinked physical properties are reduced, as shown by the low $M_H$ value attained.

This example illustrates that one cannot predict the effect of blending dissimilar co-curing agents such as peroxide, monomeric coagents and elemental sulfur or sulfur containing compounds with the objective of maintaining an acceptable level of crosslinking together with low surface tackiness when curing in the presence of air. One may postulate that if the overall level of crosslinking can be improved with various coagents and peroxide, the surface tackiness in the presence of air can be improved. However, our data shows that one can improve the level of crosslinking while not improving the surface tackiness when curing in the presence of air.

In addition, when the surface tack was finally reduced using teaching from the prior art, it was found that the overall crosslinking was undesirable. Crosslinking within the sample (excluding air) and crosslinking the surface in the presence of air are two separate processes. Increasing or decreasing the level of crosslinking coagents or use of the various co-curing agents in combination with peroxide leads to unpredictable results. Crosslinking coagents such as HVA-2 help to increase the level of crosslinking with peroxides cures, but appear to provide a poor surface tack in air cure. When using monomeric coagents, e.g., HVA-2 or SR 350 in combination with other co-curing agents, such as elemental sulfur or sulfur donor/accelerator compounds, as taught in the art, we find that the final physical properties are severely reduced, thus negating the advantages of a monomeric coagent-peroxide cure system.

TABLE 1

| Run # | 1 | 2 | 3 | 4 | 5 | 6 |
|---|---|---|---|---|---|---|
| VISTALON ® 504 EPM elastomer | 100 | 100 | 100 | 100 | 100 | 100 |
| The various components below were added as (phr) parts by weight per 100 parts of rubber, "as is," without correcting for assay. | | | | | | |
| N 774 hr) Carbon Black | 75 | 75 | 75 | 75 | 75 | 75 |
| LW150 Oil phr | 10 | 10 | 10 | 10 | 10 | |
| ZnO (phr) | 5 | 5 | 5 | 5 | 5 | 5 |
| AgeRite MA (antioxidant) | 1 | 1 | 1 | 1 | 1 | 1 |
| LUPEROX ® 231XL 40% Peroxide | 8 | 8 | 8 | 8 | 8 | 8 |
| SR-350 ® (phr) | — | — | — | 4.0 | — | — |
| HVA-2 | — | 2.0 | — | — | 2.0 | 2.0 |
| Sulfur | 0.3 | — | — | 0.3 | 0.3 | — |
| Sulfads ® (98%) | — | — | 12 | — | — | 1.2 |

TABLE 1-continued

| Run # | 1 | 2 | 3 | 4 | 5 | 6 |
|---|---|---|---|---|---|---|
| Crosslinking, MDR 2000E Moving Die Rheometer at 150° C. | | | | | | |
| $M_H$ in.-lb.. | 29 | 39 | 20 | 44 | 43 | 29 |
| Curing in hot air for 10 minutes at 365° F. to determine surface tack | | | | | | |
| Surface Tack* | 7 | 7 | 6 | 10 | 7 | 1 |

*Surface Tackiness Rating: 1–10 where 10 is very tacky and 1 is no tack.

Example 2

Compounding of Prior Art Peroxide Formulations Versus Novel Peroxide Formulations for Crosslinking Fully Saturated (No Double Bonds Within the Polymer Chains) Elastomers The novel peroxide formulation provides good physical properties associated with a conventional peroxide cure, plus an unexpected non-tacky surface when crosslinking in the presence of air.

In this example, 40% assay dicumyl peroxide dispersed on clay, was used to crosslink EPM (polyethylene propylene copolymer) VISTALON® 707 (Exxon). Table 2, run #1, dicumyl peroxide blended with SR 206 (ethylene glycol dimethacrylate) was evaluated for crosslinking in the MDR, % compression set and in hot air cure for surface tack. Note: prior art (U.S. Pat. No. 4,983,685) used SR 206 as an optional monomeric coagent in their examples. This peroxide and coagent blend produced a good cure ($M_H$) and % compression set, with a very sticky surface upon hot air cure at 400° F. Addition of Sulfads® (98% dipentamethylene thiuram tetra sulfide) at the prior art claimed levels of 2.5 parts to the peroxide SR 206 blend improved the surface but totally destroyed % compression set; Table 2, run #2.

Using prior art levels in the specification of U.S. Pat. No. 4,983,685 of 0.8 parts of Sulfads, Table 2, run #4 together with an optional 2.2 parts HVA-2 coagent, 5 parts DC40 provided good surface, but very poor % compression set. Note: percent compression set values of 100% to 60% would be expected for sulfur vulcanization, not peroxide crosslinking.

Table 2, run #3, prior art taught levels of 5 parts Vanox ZMTI (93% Zinc 2-mercapto-toluimidazole) with optional SR-206 coagent, improved compression set but gave a very sticky, unacceptable surface.

Unexpectedly, Table 2, run #5, low levels of dipentamethylene thiuram tetra sulfide (at 0.4 parts which falls outside of U.S. Pat. No. 4,983,685), 0.4 parts of Durax (98% N-cyclohexyl-2-benzothiazolesulfenamide) and 5 parts DC40 (40% dicumyl peroxide), provides a tack free surface when cured in a hot air oven with an improved 41% compression set and better level of crosslinking.

Table 2, run #6, shows that, unexpectedly, 0.4 parts Durax, 0.4 parts of Vanax A (98% 4,4'-dithiodimorpholine), 2.2 parts HVA-2 monomeric coagent and parts DC40 (40% dicumyl peroxide), provided a tack free surface with 31% compression set. The use of the Durax and/or Vanax A, with peroxide and bismaleimide type coagent, for use in hot air cure of elastomers, has not been taught in the prior art. Table 2, run 7, use of 0.8 parts of Durax, instead of the Durax/Vanax blend, provided a further unexpected outstanding % compression set value of 21% with a non-tacky surface upon hot air cure at 400° F.

Lastly, Table 2 run #8, unexpectedly outstanding results were obtained; an excellent, tack free surface with very desirable, extremely low 18% compression set using the novel blend of 2.2 parts HVA-2, 0.4 parts VULTAC 5, 0.4 parts Durax and 5 parts DC40. VULTAC 5 (75% alkyl phenol disulfide polymer from Elf Atochem) has not been taught by the art for use in hot air cure of elastomers together with peroxide and bismaleimide type coagent. Note that 0.4 parts of VULTAC 5 is equivalent to adding 0.3 parts of the alkyl phenol disulfide polymer, due to the 75% assay.

This example shows that prior art formulations using peroxide and high levels of select compounds, such as dipentamethylene thiuram tetra sulfide, blended with optional monomeric coagents do, in fact, produce a tack-free surface but provide very poor final physical properties for the crosslinked elastomer. Using 0.8 parts of a thiuram preferred compound taught by the prior art's U.S. Pat. No. 4,983,685 disclosure, but less than the 2.5 to 20 part levels claimed, produced a crosslinked elastomer with very poor heat aging properties for a peroxide cure formulation.

The high 60%+ compression set values show that the prior art crosslinked polymer permanently deformed under applied pressure over 70 hours at 150° C., a standard test (ASTM D-395-61) for a peroxide cure. A tack free surface can be obtained in hot air by sulfur vulcanization for unsaturated polymers, but results in poor heat aging properties. There is no advantage to a peroxide cure system cured in hot air over a sulfur vulcanization if there are no significant differences in physical properties, e.g., low $M_H$ and/or high (poor) percent compression set values. Peroxide cures have been traditionally the choice for a number of high temperature and high performance applications. Peroxide crosslinking provides carbon bon bonds which allow the crosslinked polymer manufacturer to use the full engineering capabilities of the elastomer.

TABLE 2

| Run # | 1 | 2 | 3 | 4 | 5 | 6 | 7 | 8 |
|---|---|---|---|---|---|---|---|---|
| VISTALON 707 EPM | 100 | 100 | 100 | 100 | 100 | 100 | 100 | 100 |
| The various components below were added as (phr) parts by weight per 100 parts of rubber, "as is," without correcting for assay. | | | | | | | | |
| N774 Carbon Black | 75 | 75 | 75 | 75 | 75 | 75 | 75 | 75 |
| LW150 process oil | 30 | 30 | 30 | 30 | 30 | 30 | 30 | 30 |
| ZnO | 5 | 5 | 5 | 5 | 5 | 5 | 5 | 5 |
| Stearic acid | 1 | 1 | 1 | 1 | 1 | 1 | 1 | 1 |
| AgeRite MA | 1 | 1 | 1 | 1 | 1 | 1 | 1 | 1 |
| DC40 | 8.0 | 8.0 | 8.0 | 5.0 | 5.0 | 5.0 | 5.0 | 5.0 |
| SR-206 | 2.0 | 2.0 | 2.0 | — | — | — | — | — |
| HVA-2 | — | — | — | 2.2 | 2.2 | 2.2 | 2.2 | 2.2 |

TABLE 2-continued

| Run # | 1 | 2 | 3 | 4 | 5 | 6 | 7 | 8 |
|---|---|---|---|---|---|---|---|---|
| Sulfads (98%) | — | 2.5 | — | 0.8 | 0.4 | — | — | — |
| ZMTI (93%) | — | — | 5.0 | — | — | — | — | — |
| Vanax A (98%) | — | — | — | — | — | 0.4 | — | — |
| VULTAC 5 (75%) | — | — | — | — | — | — | — | 0.4 |
| Durax (98%) | — | — | — | — | 0.4 | 0.4 | 0.8 | 0.4 |
| MDR Cure at 170° C. | | | | | | | | |
| $M_H$ in-lb | 17 | 9 | 16 | 17 | 18 | 17 | 16 | 16 |
| $T_{S1}$ min | 1.04 | 1.56 | 1.06 | 1.20 | 1.11 | 0.61 | 0.58 | 0.63 |
| $T_{C90}$ min | 5.8 | 7.5 | 5.5 | 6.6 | 5.2 | 5.9 | 4.1 | 4.2 |
| Cure in 400° F. air for 12 min. | | | | | | | | |
| Surface | 10 | 1.5 | 7 | 1.5 | 2 | 2.5 | 2.5 | 2 |
| Compression Set 70 hr. at 150° C. | | | | | | | | |
| % Compression Set | 25 | 100 | 35 | 63 | 41 | 31 | 21 | 18 |

Example 3

Novel Peroxide-additive Compositions Produce Solid or Foamed Crosslinked Elastomer in Hot Air, With Outstanding Physical Properties, e.g., Percent Compression Set, While Also Producing a Non Tacky Surface When Curing in the Presence of Air The elastomer used in this example was Uniroyal® X3378 EPDM containing 4% dicyclopentadiene as the termonomer. Peroximon DC 40KEP (40% dicumyl peroxide on clay) was used as the peroxide crosslinking agent. In this example the levels of Sulfads® (98% dipentamethylene thiuram tetra sulfide), VULTAC® 5 (75% alkyl phenol disulfide polymer) and Durax® (98% N-cyclohexyl-2-benzothiazolesulfenimide) were varied, keeping the peroxide and HVA-2 coagent constant (Table 3, runs #2 to #6).

Note: adding 0.5 parts (phr) Sulfads is equivalent to 0.49 parts of dipentamethylene thiuram tetra sulfide, per 100 parts of rubber. Referring to runs #2, #3 and #4, unexpectedly, excellent compression set and a tack free surface were found when using dipentamethylene thiuram tetra sulfide below 0.5 phr, on a pure basis with HVA-2 and peroxide.

When the Sulfads (98% dipentamethylene thiuram tetra sulfide), VULTAC 5 and Durax concentration were varied, it was unexpectedly discovered that both solid and foamed crosslinked elastomers could be produced by hot air cure using our novel peroxide/additive composition. Foamed crosslinked elastomer with a tack free surface was obtained when using <0.5 phr pure dipentamethylene thiuram tetra sulfide, with either VULTAC 5 or Durax; see Table 3, runs #2, #3 and #4. Using VULTAC 5 or a blend of VULTAC 5 with Durax provided solid crosslinked EPDM, Table 3, runs #5 and #6. Unexpectedly in each case (Table 2, runs #2 to #6) outstanding percent compression set values were obtained, virtually equivalent to a conventional peroxide cure, provided in Table 2, run #1.

Sulfur vulcanization compression sets are measured at approximately 100° C.–120° C. and rarely determined at 150° C. due to constant poor performance at elevated temperature. The present 150° C., 70 hour desirable compression set data proves that these novel peroxide-additive compositions illustrated in the practice of this invention produce crosslinked EPDM with unexpectedly good heat aging properties. In addition, the novel peroxide-additive compositions surprisingly provide a way to produce both solid and foamed articles.

Although not wishing to be bound, it is thought that faster scorch times related to the unexpected crosslinked network sets up faster than gas evolution from the cure system early in the cure to provide solid cured articles, which is more difficult under low pressure conditions in an oven as opposed to a closed mold. When that scorch time is delayed, the gas evolution may coincide with the crosslink network formation. Furthermore, in addition to these various unexpected processing and engineering advantages, these novel peroxide formulations provide a completely tack free surface when cured in the presence of air.

TABLE 3

| Run # | 1 | 2 | 3 | 4 | 5 | 6 |
|---|---|---|---|---|---|---|
| Uniroyal X3378 EPDM | 100 | 100 | 100 | 100 | 100 | 100 |
| The various components below were added as (phr) parts by weight per 100 parts of rubber, "as is," without correcting for assay. | | | | | | |
| N774 Carbon Black | 100 | 100 | 100 | 100 | 100 | 100 |
| Sunpar 2280 Oil | 30 | 30 | 30 | 30 | 30 | 30 |
| ZnO | 4 | 4 | 4 | 4 | 4 | 4 |
| Stearic acid | 0.5 | 0.5 | 0.5 | 0.5 | 0.5 | 0.5 |
| AgeRite D | 1 | 1 | 1 | 1 | 1 | 1 |
| DC40KEP 40% Dicumyl Peroxide | 8.0 | 5.2 | 5.2 | 5.2 | 5.2 | 5.2 |
| HVA-2 | — | 2.0 | 2.0 | 2.0 | 2.0 | 2.0 |
| Sulfads (98%) | — | 0.5 | 0.3 | 0.3 | — | — |
| VULTAC 5 (75%) | — | — | — | 0.5 | 0.8: | 0.5 |
| Durax (98%) | — | 0.3 | 0.5 | — | — | 0.3 |
| MDR at 170° C. | | | | | | |
| $M_H$ in-lb | 24 | 30 | 30 | 31 | 32 | 31 |
| $T_{S1}$ min | .53 | .83 | .76. | .69 | .55 | .54 |
| $T_{C90}$ min | 7.9 | 5.9 | 5.6 | 5.5 | 4.9 | 4.7 |
| Compression set 70 hrs. at 150° C. | | | | | | |
| % Compression Set | 21 | 30 | 24 | 27 | 22 | 19 |
| Air cure at 400° F. for 10 min. | | | | | | |
| Surface | 10 | 1 | 1 | 1 | 1 | 1 |
| Gassing | No | Yes | Yes | Yes | No | No |

Example 4

Novel Peroxide-additive Compositions are Studied Using a Fast Cure, Higher Ethylene EPDM (Royalene 509 EPDM) Using Dicumyl Peroxide and HVA-2 in Table 4

The prior art formulations (Table 4, runs #2 and #3) provided a good surface after hot air cure, but unfortunately, resulted in very poor 150° C./70 hour compression set physical properties and exhibited a highly undesirable odor. These 61% and 71% compression set values are similar to what one would obtain from a sulfur vulcanization, not a peroxide cure. In addition, the prior art samples #2 and #3 which used 2.5 parts of Sulfads®, had large gas bubbles trapped at the center of the cured parts; considered an unacceptable cure defect.

In contrast, all the samples (runs #5 to #12) using the novel peroxide-additive composition taught by this invention, provided outstanding physical properties, i.e., very low compression set values at 150°/70 hours, very similar to that obtained by the use of the peroxide control reaction with no coagent or sulfur additive (Table 1, run #1). In that control reaction a 15% compression set was obtained, despite the very sticky surface (10 out of 10) for the hot air cure study. The blend of HVA-2 coagent with peroxide (run #4) and the antioxidant AgeRite D (typically incorporated as standard practice in rubber formulations) provided a good compression set value at the reduced 120° C./70 hour test temperature, but unfortunately, a poor surface (7 out of 10) when crosslinking in the presence of air. All samples included in this invention, runs #5 to #12, provided excellent physical properties associated with a peroxide cure, plus a tack free surface when cured in the presence of air.

Example 5

Evaluation of Common Classes of Coagents to Demonstrate the Uniqueness of the Use of Bismaleimide Coagents With Selected Additive, for Utility in Providing Good Overall Peroxide-type Physical Properties With the Ability to Cure the Surface of a Rubber (Tack-free Surface) in the Presence of Air The bismaleimide is evaluated in combination with Sulfads® and VULTAC® 5 together with dicumyl peroxide for crosslinking a fast cure, type EPDM (Royalene® 509 EPDM).

The prior art teachings use various Co agents both monomeric and non-monomeric to improve crosslinking efficiency, but have no relation to their effect with air contact. We found that the use of these various coagents are just as likely to increase reactions with oxygen and make the rubber surface more tacky after curing in the presence of air, versus the bismaleimide In Table 5, the HVA-2 (bismaleimide-type, coagent) provided a tack free surface with the blend of 0.3 parts Sulfads and 0.2 parts of VULTAC 5. Use of other agents provided a sticky surface, e.g., TAC (triallyl cyanurate), SR-350 (trimethylolpropane trimetharylate), 1.2 BR (1,2 liquid butadiene rubber), Santolink XI-100 (allyl glycidyl ether alcohol resin), TAP (triallyl phosphate) and pBQ (para benzoquinone).

TABLE 4

| | 1 | 2 | 3 | 4 | 5 | 6 | 7 | 8 | 9 | 10 | 11 | 12 |
|---|---|---|---|---|---|---|---|---|---|---|---|---|
| Royalene 521 EPDM | 100 | 100 | 100 | 100 | 100 | 100 | 100 | 100 | 100 | 100 | 100 | 100 |

The various components below were added as (phr) parts by weight per 100 parts of rubber, "as is," without correcting for assay.

| | 1 | 2 | 3 | 4 | 5 | 6 | 7 | 8 | 9 | 10 | 11 | 12 |
|---|---|---|---|---|---|---|---|---|---|---|---|---|
| N550 | 50 | 50 | 50 | 50 | 50 | 50. | 50 | 50 | 50 | 50 | 50 | 50 |
| N990 | 25 | 25 | 25 | 25 | 25 | 25 | 25 | 25 | 25 | 25 | 25 | 25 |
| LW150 oil | 20 | 20 | 20 | 20 | 20 | 20 | 20 | 20 | 20 | 20 | 20 | 20 |
| ZnO | 4 | 4 | 4 | 4 | 4 | 4 | 4 | 4 | 4 | 4 | 4 | 4 |
| Stearic Acid | 1 | 1 | 1 | 1 | 1 | 1 | 1 | 1 | 1 | 1 | 1 | 1 |
| AgeRite D | 1 | 1 | 1 | 1 | 1 | 1 | 1 | 1 | 1 | 1 | 1 | 1 |
| DC40 KEP 40% | 7.2 | 5.0 | 5.0 | 5.0 | 5.0 | 5.0 | 5.0 | 5.0 | 5.0 | 5.0 | 5.0 | 5.0 |
| HVA-2 | — | 2.2 | — | 2.2 | 2.2 | 2.2 | 2.2 | 2.2 | 2.2 | 2.2 | 2.2 | 2.2 |
| SR-206 | — | — | 2.2 | — | — | — | — | — | — | — | — | — |
| Sulfads 98% | — | 2.5 | 2.5 | — | 0.5 | 0.3 | 0.3 | — | 0.3 | 0.3 | 0.3 | 0.3 |
| Vanex A 98% | — | — | — | — | — | — | — | 0.3 | — | — | — | — |
| M. Tuads 98% | — | — | — | — | — | 0.2 | — | — | — | — | — | — |
| Durex 98% | — | — | — | — | — | — | 0.2 | 0.2 | — | — | — | — |
| Unads 98% | — | — | — | — | — | — | — | — | 0.2 | — | — | — |
| M. Zimate 98% | — | — | — | — | — | — | — | — | — | 0.2 | — | — |
| M. Niclate 98% | — | — | — | — | — | — | — | — | — | — | 0.2 | — |
| M. Cumate 98% | — | — | — | — | — | — | — | — | — | — | — | 0.2 |

MDR at 170° C., 1 degree arc

| | 1 | 2 | 3 | 4 | 5 | 6 | 7 | 8 | 9 | 10 | 11 | 12 |
|---|---|---|---|---|---|---|---|---|---|---|---|---|
| $M_H$ | 39 | 43 | 27 | 45 | 40 | 38 | 40 | 42 | 38 | 38 | 41 | 37 |
| $T_{S1}$ | .45 | .68 | .75 | .38 | .60 | .62 | .58 | .42 | .65 | .46 | .56 | .53 |
| $T_{C90}$ | 7.1 | 4.3 | 2.5 | 4.6 | 4.8 | 5.3 | 4.6 | 4.9 | 4.8 | 5.1 | 4.8 | 5.2 |

Cure in air at 400° F. for 12 min.

| | 1 | 2 | 3 | 4 | 5 | 6 | 7 | 8 | 9 | 10 | 11 | 12 |
|---|---|---|---|---|---|---|---|---|---|---|---|---|
| Surface | 10 | 1 | 1 | 7 | 1 | 1 | 1 | 1 | 1 | 1 | 1 | 1 |

Percent Compression set 120° C. for 70 hours

| | 1 | 2 | 3 | 4 | 5 | 6 | 7 | 8 | 9 | 10 | 11 | 12 |
|---|---|---|---|---|---|---|---|---|---|---|---|---|
| % Set | 11 | 46 | — | 8 | 16 | 18 | 14 | — | 15 | — | — | — |

Percent Compression set 150° C. for 70 hours

| | 1 | 2 | 3 | 4 | 5 | 6 | 7 | 8 | 9 | 10 | 11 | 12 |
|---|---|---|---|---|---|---|---|---|---|---|---|---|
| % Set | 15 | 61 | 71 | — | — | — | 19 | 17 | — | 21 | 17 | 21 |

TABLE 5

| Run # | 1 | 2 | 3 | 4 | 5 | 6 | 7 | 8 | 9 |
|---|---|---|---|---|---|---|---|---|---|
| Royalene 509 EPDM | 100 | 100 | 100 | 100 | 100 | 100 | 100 | 100 | 100 |
| The various components below were added as (phr) parts by weight per 100 parts of rubber, "as is," without correcting for assay. | | | | | | | | | |
| N550 | 50 | 50 | 50 | 50 | 50 | 50 | 50 | 50 | 50 |
| N990 | 25 | 25 | 25 | 25 | 25 | 25 | 25 | 25 | 25 |
| LW150 oil | 20 | 20 | 20 | 20 | 20 | 20 | 20 | 20 | 20 |
| ZnO | 4 | 4 | 4 | 4 | 4 | 4 | 4 | 4 | 4 |
| Stearic acid | 1 | 1 | 1 | 1 | 1 | 1 | 1 | 1 | 1 |
| AgeRite D | 1 | 1 | 1 | 1 | 1 | 1 | 1 | 1 | 1 |
| DC 40KEP | 5.4 | 5.4 | 5.4 | 5.4 | 5.4 | 5.4 | 5.4 | 5.4 | 5.4 |
| Sulfads 98% | — | 0.3 | 0.3 | 0.3 | 0.3 | 0.3 | 0.3 | 0.3 | 0.3 |
| VULTAC 5 98% | — | 0.2 | 0.2 | 0.2 | 0.2 | 0.2 | 0.2 | 0.2 | 0.2 |
| HVA-2 | — | — | 2.0 | — | — | — | — | — | — |
| TAC | — | — | — | 3.0 | — | — | — | — | — |
| SR-350 | — | — | — | — | 4.0 | — | — | — | — |
| 1,2 BR | — | — | — | — | — | 6.0 | — | — | — |
| Santolink XI-100 | — | — | — | — | — | — | 4.0 | — | — |
| TAP | — | — | — | — | — | — | — | 4.0 | — |
| pBQ | — | — | — | — | — | — | — | — | 1.0 |
| MDR Cure at 170° C. | | | | | | | | | |
| $M_H$ in-lb | 32 | 27 | 42 | 26 | 32 | 27 | 19 | 23 | 22 |
| $T_{C90}$ min | 7.7 | 6.6 | 4.5 | 7.6 | 6.7 | 8.2 | 7.0 | 7.2 | 9.5 |
| Cure in air at 200° C. | | | | | | | | | |
| Surface | 10 | 4 | 1 | 7 | 7 | 4 | 4 | 4 | 4 |

Example 6

Use of Low Levels of Prior Art Sulfur Accelerators Blended With HVA-2 and Dicumyl Peroxide Does not Provide Tack Free Surface. Unexpectedly, Use of Low Level Prior Art Compounds With HVA-2 and Select Compounds Provide a Tack-free Surface When Crosslinking a Fast Cure EPDM (Royalene® 509) in the Presence of Air Using 0.2 parts of Methyl Zimate (98% zinc dimethyldithiocarbamate) or 0.2 parts Unads (98% tetramethylthiuram monosulfide) with HVA-2 provided poor surface cure (sticky surface) when curing in the presence of air. Thus, it is not obvious to use very low levels of the prior art compounds in combination with HVA-2 (N,N'-phenylene bismaleimide) coagent and peroxide to provide a tack-free surface for crosslinked elastomers in the presence of air.

Unexpectedly, when VULTAC® 5 (75% alkyl phenol disulfide polymer) or Vanax® A (98% 4,4'dithiodimorpholine) is blended with these low levels of prior art compounds, e.g., Methyl Zimate or Unads, one obtains a tack-free surface when crosslinking in the presence of air.

Thus, a unique blend of peroxide, HVA-2 coagent, and low levels of dithiocarbamates or thiurams with VULTAC 5 or Vanax A provides a crosslinked polymer with a cured surface in the presence of air. In addition, no gassing was noted, thus, solid crosslinked parts can be formed with these novel blends.

TABLE 6

| Run # | 1 | 2 | 3 | 4 | 5 | 6 | 7 | 8 | 9 |
|---|---|---|---|---|---|---|---|---|---|
| Royalene 509 EPDM | 100 | 100 | 100 | 100 | 100 | 100 | 100 | 100 | 100 |
| The various components below were added as (phr) parts by weight per 100 parts of rubber, "as is," without correcting for assay. | | | | | | | | | |
| N774 | 75 | 75 | 75 | 75 | 75 | 75 | 75 | 75 | 75 |
| Sunpar 2280 Oil | 20 | 20 | 20 | 20 | 20 | 20 | 20 | 20 | 20 |
| ZnO | 5 | 5 | 5 | 5 | 5 | 5 | 5 | 5 | 5 |
| Stearic acid | 0.5 | 0.5 | 0.5 | 0.5 | 0.5 | 0.5 | 0.5 | 0.5 | 0.5 |
| DC40KEP 40% | 7.0 | 5.0 | 5.0 | 5.0 | 5.0 | 5.0 | 5.0 | 5.0 | 5.0 |
| HVA-2 | — | 1.5 | 1.5 | 1.5 | 1.5 | 1.5 | 1.5 | 1.5 | 1.5 |
| M. Zimate 98% | — | 0.2 | 0.2 | 0.2 | 0.2 | — | — | — | — |
| Unads 98% | — | — | — | — | — | 0.2 | 0.2 | 0.2 | 0.2 |
| Vanax A 98% | — | — | 0.5 | — | — | — | 0.5 | — | — |
| Sulfur | — | — | — | 0.15 | — | — | — | 0.15 | — |
| VULTAC 5 75% | — | — | — | — | 0.67 | — | — | — | 0.67 |
| MDR at 170° C. | | | | | | | | | |
| $M_H$ in-lb | 43 | 42 | 41 | 43 | 41 | 43 | 40 | 42 | 41 |
| $T_{S1}$ min | 0.38 | 0.34 | 0.45 | .042 | 0.40 | 0.47 | 0.50 | 0.47 | 0.49 |
| $T_{C90}$ min | 7.2 | 4.6 | 4.8 | 4.4 | 4.4 | 4.5 | 5.3 | 4.7 | 4.5 |

TABLE 6-continued

| Run # | 1 | 2 | 3 | 4 | 5 | 6 | 7 | 8 | 9 |
|---|---|---|---|---|---|---|---|---|---|
| Cure in air at 420° F. or 8 min. | | | | | | | | | |
| Surface | 10 | 7 | 1 | 4 | 1 | 7 | 1 | 4 | 1 |
| Gassing | No | No | No | No | No | No | No | No | No |

Example 7

The use of Low Levels of Prior Art Elemental Sulfur With Low Levels of Prior Art Sulfads®, With or Without Optional HVA-2 Monomeric Coagent, Provides Good Surface Cure in Hot Air, However, Poor Physical Properties (61% and 49% Compression Set)

Thus, the concept of using low levels of known prior art sulfur compounds with suggested coagent and peroxide does not readily lead to a combination of good surface cure and desired physical properties expected.

TABLE 7

| | 1 | 2 | 3 | 4 |
|---|---|---|---|---|
| Keltan 4906 EPDM | 100 | 100 | 100 | 100 |
| The various components below were added as (phr) parts by weight per 100 parts of rubber, "as is," without correcting for assay. | | | | |
| N 774 | 80 | 80 | 80 | 80 |
| N 330 | 20 | 20 | 20 | 20 |
| LW 150 Oil | 40 | 40 | 40 | 40 |
| ZnO | 6 | 6 | 6 | 6 |
| Stearic Acid | 1 | 1 | 1 | 1 |
| AgeRite D | 1 | 1 | 1 | 1 |
| DC40P (40%) | 5 | 5 | 5 | 5 |
| HVA-2 | — | — | 1.8 | 1.8 |
| Sulfur | — | 0.2 | — | 0.2 |
| Sulfads (98%) | — | 0.4 | — | 0.4 |
| 420° F. for 8 min. cure in air Surface (1 to 10) 10 = Sticky | 10 | 1 | 10 | 1 |
| Compression set 120° C./70 hrs. | | | | |
| Percent Compression Set | 25% | 61% | 12% | 49% |

Example 8

In This Example, it is Shown That the Novel Peroxide-additive Composition Performs Well in Filled and Non-filled EPDM Formulations Run #2 contains only EPDM and the novel peroxide-additive formulating, i.e., no oil, carbon black, ZnO or stearic acid. Note: the novel formulation, as taught in the practice of the invention, provides a completely tack free surface when cured in the presence of air, (1 out of 10) where 10 is tacky. Addition of normal levels of carbon black and oil (run #4) provides excellent tack free surface in the presence of air. Use of very high levels of carbon black (that exceed the amount of EPDM used) and high levels of oil as shown in Table 8, runs #6 and #8, show the expected reduction in the level of crosslinking ($M_H$) for an organic peroxide type cure. However, the resulting surface cure in the presence of air is surprisingly good (4 out of 10) as shown in run #8, when the level of peroxide-additive blend was increased. It is well known that peroxide cures are adversely affected by high levels of oil and carbon black. The peroxide radicals can be readily abstract hydrogens from the oil as well as from the rubber. When the oil concentration is increased, this significantly reduces the peroxide cure efficiency. This is shown by the reduction in $M_H$ for the two peroxide controls, with no additives (compare normal levels of oil and carbon black run #3 to high levels of oil and carbon black run #5).

TABLE 8

| Run # | 1 | 2 | 3 | 4 | 5 | 6 | 7 | 8 |
|---|---|---|---|---|---|---|---|---|
| Royalene 509 EPDM | 100 | 100 | 100 | 100 | 100 | 100 | 100 | 100 |
| The various components below were added as (phr) parts by weight per 100 parts of rubber, "as is," without correcting for assay. | | | | | | | | |
| N774 carbon black | — | — | 75 | 75 | 130 | 130 | 130 | 130 |
| Sunpar 2280 oil | — | — | 20 | 20 | 60 | 60 | 60 | 60 |
| ZnO | — | — | 5.0 | 5.0 | 5.0 | 5.0 | 5.0 | 5.0 |
| Stearic acid | — | — | 0.5 | 0.5 | 0.5 | 0.5 | 0.5 | 0.5 |
| DC40KEP 40% | 7.00 | 5.00 | 7.00 | 5.00 | 7.00 | 5.00 | 10.5 | 7.50 |
| HVA-2 | — | 1.50 | — | 1.50 | — | 1.50 | — | 2.25 |
| VULTAC 5 75% | — | 0.67 | — | 0.67 | — | 0.67 | — | 1.00 |
| B. Zimate 98% | — | 0.20 | — | 0.20 | — | 0.20 | — | 0.30 |
| Crosslinking MDR Cure at 170° C., 1° arc | | | | | | | | |
| $M_H$ in-lb | 40 | 31 | 43 | 41 | 18 | 24 | 26 | 31 |
| $T_{S1}$ min | 0.45 | 0.46 | 0.38 | 0.40 | 0.54 | 0.50 | 0.43 | 0.44 |
| $T_{C90}$ min | 8.3 | 5.8 | 7.2 | 4.4 | 7.0 | 4.2 | 6.6 | 3.8 |
| Cure in air at 375° F. for 14 min. | | | | | | | | |
| Surface | 7 | 1 | 10 | 1 | 10 | 6 | 10 | 4 |

Example 9

Novel Peroxide-additive Blends are Used to Hot Air Cure a Very Highly Filled EPDM This highly filled EPDM contains a large amount of carbon black and oil. Such formulations are only used for sulfur vulcanization, and are not typically used in peroxide cure. The successful use in these examples shows the unexpected tremendous utility of these novel peroxide-additive blends. In addition, the effectiveness of this system is illustrated by providing examples using four different organic peroxides. These are LUPEROX® 231-XL=40% 3,3,5-trimethyl-1,1-di(t-butylperoxy)cyclohexane; LUPEROX 230-XL=40% n-Butyl4,4di(t-butylperoxy) valerate; Peroximon DC40KEP=40% dicumyl peroxide and Peroximon F40KEP 40% di(t-butylperoxy) diisopropylbenzene.

The peroxide controls (Table 9, runs #1, #3, #5 and #7) are all tacky due to an under cured surface when crosslinking in the presence of air. They also contain some gas bubbles in the interior of the sample. The novel peroxide-additive formulations used in this invention provide a fully cured surface (non-tacky) when crosslinking in the presence of air, see Table 9, runs #2, #4, #6 and #8. Unexpectedly, these formulations cure to a higher level of crosslinking to the point that there was no foaming (gas bubbles). Thus, the novel peroxide formulations provide a desirable, solid, crosslinked part with a non-sticky surface upon hot air cure. The cure times vary because of the different peroxides used, but unexpectedly the surfaces are always tack-free, despite the large amount of filler and oil used.

Example 10

ADA (Azodicarbonamide) is a Blowing Agent Which is Used to Create Foamed Articles In Table 10, ADA is used to produce hot air cured, free-rise, crosslinked EPDM sponge using our novel peroxide-additive formulations to create a tack free surface. The peroxide control with no additive or ADA is provided in Table 10, run #1. Note: the level of crosslinking was $M_H$=19.8 inch-lbs, as per the Moving Die Rheometer (MDR 2000E, at 200° C. and 1° arc). Note, however, the surface was very sticky when crosslinking in the presence of air. The Tangent delta for run #1 (peroxide control) was 0.064, a desirable low value. The MDR can measure tan δ (tangent delta) which can be determined by dividing the viscous moduli by the elastic moduli. A cured compound with a very low tangent delta will be very resilient and exhibit low hysteresis. A higher tangent delta value means that the polymer chains can undergo permanent movement or deformation, after an applied stress. Table 10, run #2, peroxide and ADA with no other additives provided and $M_H$=17.6 inch-lbs, so the ADA appears to reduce the level of crosslinking, although gas pressure can also affect the reading, compared to non #1 while continuing to provide a sticky surface.

Table 10, run #3, use of peroxide, ADA and coagent blend N,N'-m-phenylene bismaleimide (HVA-2) and 1,3-bis (citraconimidomethyl)benzene (Perkalink 900) provided improved crosslinking performance, based on the higher $M_H$ of 24.9 in-lbs, but the surface was very sticky (7 rating out of 10) after hot air cure. Coagents with peroxide helps to improve the cure, but continue to provide poor surface due to air inhibition.

TABLE 9

| Run # | 1 | 2 | 3 | 4 | 5 | 6 | 7 | 8 |
|---|---|---|---|---|---|---|---|---|
| Nordel 2470 EPDM | 100 | 100 | 100 | 100 | 100 | 100 | 100 | 100 |
| The various components below were added as (phr) parts by weight per 100 parts of rubber, "as is," without correcting for assay. | | | | | | | | |
| N762 | 100 | 100 | 100 | 100 | 100 | 100 | 100 | 100 |
| N650 | 100 | 100 | 100 | 100 | 100 | 100 | 100 | 100 |
| 2280 oil | 100 | 100 | 100 | 100 | 100 | 100 | 100 | 100 |
| Lup 231 KE 40% | 16.0 | 10.0 | — | — | — | — | — | — |
| Lup 230 XL 40% | — | — | 16.0 | 10.0 | — | — | — | — |
| Per DC40P 40% | — | — | — | — | 16.0 | 10.0 | — | — |
| Per F40P 40% | — | — | — | — | — | — | 16.0 | 10.0 |
| HVA-2 | — | 4.0 | — | 4.0 | — | 4.0 | — | 4.0 |
| Vanax A 98% | — | 0.3 | — | 0.3 | — | 0.3 | — | 0.3 |
| Durax 98% | — | 0.2 | — | 0.2 | — | 0.2 | — | 0.2 |
| VULTAC 5 75% | — | 1.5 | — | 1.5 | — | 1.5 | — | 1.5 |
| MDR Temp. | 150° C. | | 165° C. | | 170° C. | | 180° C. | |
| $M_H$ in-lb | 11 | 26 | 11 | 23 | 14 | 26 | 20 | 29 |
| $T_{S1}$ min | .50 | .48 | .53 | .49 | .52 | .56 | .38 | .38 |
| $T_{C90}$ min | 4.6 | 5.4 | 4.4 | 4.5 | 7.0 | 5.0 | 5.4 | 3.1 |
| Cure in air for 14 min. | | | | | | | | |
| | 360° F. | | 390° F. | | 400° F. | | 415° F. | |
| Surface | 10 | 2 | 10 | 1 | 10 | 1 | 10 | 1 |
| Gassing | V.sli | No | Sli. | No | Sli. | No | Sli. | No |

Table 10, run #4, low levels of certain additives, ADA and no coagent with peroxide improves the surface (4 to 5 out of 10) after hot air cure, but the crosslinking is very low ($M_H$=14.9 in-lbs) with an undesirable Tangent Delta of 0.095.

Unexpectedly the use of a coagent blend (HVA-2 and Perkalink 900) with low levels of select additives, peroxide and ADA blowing agent as per our invention provided excellent crosslink density ($M_H$ of 22.2 in-lbs) and a very good surface (2 out of 10) when cured in hot air (Table 10, run #5). Note: a uniform foamed EPDM with a density of 30 lbs/cu. ft was produced.

As taught in prior art, Table 10 run #7, use of Vanox ZMTI (93% Zinc 2-mercapto-toluimidazole) at 5 phr peroxide plus ADA provides a non tacky surface in hot air cure with unfortunately a low $M_H$ of only 16.9 in-lbs and a corresponding poor tangent delta, compared to run #5.

Use of Captax (98% 2-mercaptobenzothiazole) as per prior art, Table 10 run #8, provides a non-tacky surface as well, however, with further degradation in final crosslinked physical properties ($M_H$ and tangent delta).

combination of good cure with tack-free surface when crosslinking EPDM in the presence of air.

Coagents in general are more efficient in Royalene® 521 EPDM compared to Royalene 509 in Example 4/Table 4. Referring to Table 11, run #5 only HVA-2 provides a tack-free surface when used in the practice of our invention, in the presence of air, and has a higher MDR torque than the peroxide control in Table 11, run #1. Although a few of the coagents provide some less reproducible improvement, only the bismaleimide-type coagent, together with the select additives at low levels, unexpectedly provide an outstanding balance of surface cure and physical properties.

In addition, the previous data in Table 5 and in Table 11 show HVA-2 to have the fastest cure time of all the coagents, while working well with the low levels of additives in the practice of our invention to provide a reduced cure time in air, a tack free surface with excellent final physical properties. The shortened cure time should help the manufacturer with improved productivity as well as producing a more superior product.

TABLE 10

| Run # | 1 | 2 | 3 | 4 | 5 | 6 | 7 | 8 |
|---|---|---|---|---|---|---|---|---|
| Royalene X3378 EPDM | 100 | 100 | 100 | 100 | 100 | 100 | 100 | 100 |
| The various components below were added as (phr) parts by weight per 100 parts of rubber, "as is," without correcting for assay. | | | | | | | | |
| N774 carbon black | 100 | 100 | 100 | 100 | 100 | 100 | 100 | 100 |
| Sunpar 228 oil | 40 | 40 | 40 | 40 | 40 | 40 | 40 | 40 |
| ZnO | 2 | 2 | 2 | 2 | 2 | 2 | 2 | 2 |
| Stearic acid | 2 | 2 | 2 | 2 | 2 | 2 | 2 | 2 |
| DC40KEP 40% | 9.0 | 9.0 | 9.0 | 9.0 | 9.0 | 4.5 | 9.0 | 9.0 |
| HVA-2 | — | — | 0.5 | — | 0.5 | 2.0 | — | — |
| Perkalink 900 | — | — | 1.5 | — | 1.5 | — | — | — |
| Sulfads 98% | — | — | — | 0.3 | 0.3 | 0.3 | — | — |
| Unads 98% | — | — | — | 0.2 | 0.2 | 0.2 | — | — |
| Vanox ZMTI 93% | — | — | — | — | — | — | 5.0 | — |
| Captax 98% | — | — | — | — | — | — | — | 5.0 |
| Azodicarbonamide ADA | — | 4.0 | 4.0 | 4.0 | 4.0 | 4.0 | 4.0 | 4.0 |
| Crosslinking in an MDR at 200° C., 1° arc | | | | | | | | |
| $M_H$ in-lb | 19.8 | 17.6 | 24.9 | 14.9 | 22.2 | 19.6 | 16.9 | 6.7 |
| Tangent Delta | .064 | .068 | .037 | .095 | .046 | 0.64 | .093 | .247 |
| $T_{S5}$ min | 0.34 | 0.36 | 0.26 | 0.39 | 0.33 | 0.38 | 0.39 | — |
| $T_{C90}$ min | 0.78 | 0.78 | 0.57 | 0.69 | 0.60 | 0.61 | 0.75 | 0.98 |
| Hot Air Cure at 400° F. for 7 min. | | | | | | | | |
| Surface | 10 | 5 | 7 | 4 | 1 | 1 | 1 | 4 |
| Density lbs/cu. ft. | 74 | 21 | 48 | 22 | 30 | 26 | 29 | 43 |
| Hot Air Cure @ 400° F. for 12 min. | | | | | | | | |
| Surface | 9 | 9 | 9 | 5 | 2 | 1 | 1 | 1 |
| Density lbs/cu. ft. | 71 | 24 | 54 | 22 | 30 | 28 | 29 | 41 |

Example 11

Common Coagents are Evaluated by Adding Them to a Sulfur Donor—Accelerator Blend Together With LUPEROX® 101-XL [45% 2,5-dimethyl-2,5-di(t-butylperoxy)hexane]

These peroxide-coagent-accelerator blends are used to cure standard EPDM to show that the maleimide type coagent, HVA-2 or Vanax MBM is the only one of those tested which is capable of providing the all important Various Components Used in Table 11

LUPEROX 101-XL (45% 2,5-dimethyl-2,5-di(t-butylperoxy)hexane

Sulfads (98% dipentamethylene thiuram tetra sulfide)

Santocure TBSI (N-t-butyl-2-benzothiazolesulfenimide)

TAIC (Triallylisocyanurate)

SR-350 (trimethylolpropane trimethacrylate)

HVA-2 (N,N'-m-phenylenebismaleimide)

DAM (diallyl mellitate)

TABLE 11

| | 1 | 2 | 3 | 4 | 5 | 6 | 7 | 8 | 9 | 10 |
|---|---|---|---|---|---|---|---|---|---|---|
| Royalene 521 EPDM | 100 | 100 | 100 | 100 | 100 | 100 | 100 | 100 | 100 | 100 |

The various components below were added as (phr) parts by weight per 100 parts of rubber, "as is," without correcting for assay.

| | 1 | 2 | 3 | 4 | 5 | 6 | 7 | 8 | 9 | 10 |
|---|---|---|---|---|---|---|---|---|---|---|
| N660 | 80 | 80 | 80 | 80 | 80 | 80 | 80 | 80 | 80 | 80 |
| 2280 Oil | 10 | 10 | 10 | 10 | 10 | 10 | 10 | 10 | 10 | 10 |
| Stearic Acid | 1 | 1 | 1 | 1 | 1 | 1 | 1 | 1 | 1 | 1 |
| Lup 101XL 45% | 4.5 | 4.5 | 4.5 | 4.5 | 4.5 | 4.5 | 4.5 | 4.5 | 4.5 | 4.5 |
| Sulfads 98% | — | 0.30 | 0.30 | 0.30 | 0.30 | 0.30 | 0.30 | 0.30 | 0.30 | 0.30 |
| TBSI | — | 0.15 | 0.15 | 0.15 | 0.15 | 0.15 | 0.15 | 0.15 | 0.15 | 0.15 |
| TAIC | — | — | 2.00 | — | — | — | — | — | — | — |
| SR-350 | — | — | — | 2.00 | — | — | — | — | — | — |
| HVA-2 | — | — | — | — | 2.00 | — | — | — | — | — |
| ZnDMA | — | — | — | — | — | 2.00 | — | — | — | — |
| DAM | — | — | — | — | — | — | 2.00 | — | — | — |
| SR-206 | — | — | — | — | — | — | — | 2.00 | — | — |
| Perkalink 900 | — | — | — | — | — | — | — | — | 2.00 | — |
| Sulfur | — | — | — | — | — | — | — | — | — | 0.20 |
| MDR at 185° C. | | | | | | | | | | |
| $M_H$ | 37 | 27 | 32 | 35 | 41 | 27 | 32 | 33 | 31 | 28 |
| $T_{S1}$ | 0.34 | 0.40 | 0.39 | 0.41 | 0.37 | 0.31 | 0.40 | 0.44 | 0.41 | 0.42 |
| $T_{C90}$ | 4.2 | 3.7 | 4.3 | 3.4 | 2.4 | 3.7 | 4.2 | 4.0 | 3.6 | 3.5 |
| Cure in air at 420° for 8 min. | | | | | | | | | | |
| Surface | 10 | 5 | 4 | 2 | 1 | 1 | 4 | 4 | 4 | 1 |

Example 12

Various Peroxide—Sulfur Cure Blends Used for Other Applications are Rated for Surface Tack (Quality) in Air Cure and Percent Compression Set Properties Compared to the Novel Blends of this Invention and to Standard Peroxide and Sulfur Cures The novel peroxide cure system in Table 12, run #2 unexpectedly gives an excellent, tack-free surface in air (1 out of 10) with an outstanding compression set equal to the peroxide cures in Table 12, runs #1, #3 and #6, which are very tacky (10 out of 10) after curing in air. Sulfur additives in Table 12, runs #4 and #5, without HVA-2, produces a poor surface with higher, less desirable compression set valued. A semi EV (semi-efficient sulfur vulcanization system) which uses low levels of elemental sulfur in Table 12, runs #7 and #8, provide expected improved surface (non-tacky) but exhibit the poor compression set values of such EV sulfur cures. The poor compression set values of 77% and 71% for the standard sulfur vulcanization systems, Table 12, runs #9 and #10, provide good, tack-free surfaces, unlike the peroxide controls of Table 12, runs #1, #3 and #6 which provide excellent 1416 percent compression set but a very sticky surface.

TABLE 12

Comparison of a novel blend (Run #2) of this invention, compared to a various peroxide-sulfur cure systems (Runs #4, #5, #7 and #8), and to standard peroxide (Runs #1, #3, and #6) and standard sulfur cure (Runs #9 and #10).

Royalene 521 EPDM 100
N 660 Black 75
2280 Oil 20
Stearic Acid 1

| Run# | 1 | 2 | 3 | 4 | 5 | 6 | 7 | 8 | 9 | 10 |
|---|---|---|---|---|---|---|---|---|---|---|
| ZnO | 1.00 | 1.00 | 1.00 | 1.00 | 1.00 | 3.00 | 3.00 | 3.00 | 3.00 | 3.00 |
| DC40KEP | 6.00 | 6.00 | 7.50 | 7.50 | 7.50 | 8.00 | 6.00 | 4.00 | — | — |
| SR-206 | 2.00 | — | — | — | — | — | — | — | — | — |
| HVA-2 | — | 2.00 | — | — | — | — | — | — | — | — |
| Sulfads 98% | — | 0.24 | — | — | — | — | 0.70 | 1.40 | — | 2.80 |
| M. Niclate 98% | — | 0.24 | — | — | — | — | — | — | — | — |
| Altax | — | — | — | — | — | — | 0.40 | 0.80 | 1.00 | 1.60 |
| Unads | — | — | — | — | — | — | 0.40 | 0.80 | 1.50 | 1.60 |
| Durax | — | — | — | 0.10 | 0.20 | — | — | — | — | — |
| Sulfur | — | — | — | 0.20 | 0.40 | — | 0.10 | 0.20 | 2.00 | 0.40 |
| MDR at 170° C. | | | | | | | | | | |
| $M_H$ (in-lbs) | 26 | 31 | 26 | 25 | 25 | 27 | 21 | 26 | 31 | 29 |

TABLE 12-continued

Comparison of a novel blend (Run #2) of this invention, compared to a various peroxide-sulfur cure systems (Runs #4, #5, #7 and #8), and to standard peroxide (Runs #1, #3, and #6) and standard sulfur cure (Runs #9 and #10).

| | Royalene 521 EPDM | 100 |
|---|---|---|
| | N 660 Black | 75 |
| | 2280 Oil | 20 |
| | Stearic Acid | 1 |

| Run# | 1 | 2 | 3 | 4 | 5 | 6 | 7 | 8 | 9 | 10 |
|---|---|---|---|---|---|---|---|---|---|---|
| $T_{S1}$ (mins) | 0.74 | 0.50 | 0.47 | 0.45 | 0.50 | 0.47 | 0.85 | 0.99 | 1.02 | 0.93 |
| $T_{C90}$ (mins) | 7.1 | 4.1 | 7.2 | 5.3 | 5.1 | 7.1 | 4.3 | 3.4 | 3.0 | 2.6 |
| Compression set 70 hrs. at 150° F. ||||||||||||
| Percent (%) Compression Set | 14 | 16 | 16 | 28 | 42 | 15 | 62 | 73 | 77 | 71 |
| Cure in air at 400° F for 8 to 12 min. ||||||||||||
| Surface | 10 | 1 | 10 | 10 | 7 | 10 | 2 | 1 | 1 | 1 |

Example 13

Storage Stability of Novel Peroxide Formulations

The powdered forms of these compositions can be premixed and stored for later use without loss of activity. In Table 13, runs #3 and #5 were Mixture 1 and Mixture 2 respectively, which were aged at room temperature for 3 months. These aged mixtures were compared to freshly prepared peroxide mixtures as shown in Table 13, run #2 and run #4. The rheometer torque versus time curves, and the quality of the crosslinked surfaces which were cured in hot air, are the same for both compounds, within experimental error. MDR torques, times and surface would be closer to the control (run #1) if components reacted during aging. In the practice of the invention, one can add the various ingredients then add the peroxide, however, premixing the various additives makes it more practical and/or easier to use.

TABLE 13

The novel peroxide compositions can be premixed and stored for later use without loss of activity or performance. Two different peroxide formulations were stored for three months.

| | Mixture 1 | Mixture 2 |
|---|---|---|
| DC40P | 64.6% | 64.6% |
| HVA-2 | 27.8 | 22.8 |
| Sulfads | 3.8 | — |
| Unads | 3.8 | — |
| VULTAC5 | — | 8.8 |
| Durax | — | 3.8 |
| Keltan 4506 EPDM | 100 | |
| N 660 Black | 50 | |
| N 550 Black | 50 | |
| 2280 Oil | 35 | |
| ZnO | 3.0 | |
| Stearic Acid | 1.5 | |

| Run # | 1 | 2 | 3 | 4 | 5 |
|---|---|---|---|---|---|
| Age of Mixture | 0 | 0 | 3mos. | 0 | 3mos. |
| DC40P | 8.0 | — | — | — | — |
| Mixture 1 | — | 7.9 | — | — | — |
| Mixture 1 | — | — | 7.9 | — | — |
| Mixture 2 | — | — | — | 7.9 | — |
| Mixture 2 | — | — | — | — | 7.9 |

TABLE 13-continued

The novel peroxide compositions can be premixed and stored for later use without loss of activity or performance. Two different peroxide formulations were stored for three months.

| Crosslinking Using the MDR @ 170° C., 1° arc | | | | | |
|---|---|---|---|---|---|
| $M_H$ (in-lbs) | 21.3 | 25.0 | 24.6 | 25.6 | 25.2 |
| $T_{S4}$ (mins) | 0.38 | 0.56 | 0.55 | 0.38 | 0.39 |
| $T_{C90}$ (mins) | 6.8 | 4.6 | 4.5 | 4.4 | 4.3 |
| Cure in air at 400° F. for 14 min. ||||||
| Surface | 10 | 2 | 1.5 | 3 | 2 |

Example 14

Use of Low Levels of Antioxidants (Phenolic Metal Dimethyldithiocarbamate Type) in Combination With Bismaleimide Coagents and Low Levels of Sulfur Donors Provide Excellent Tack-free Surfaces When Curing Elastomers in the Presence of Air and Also Provides Desirable Final Physical Properties (i.e., Low % Compression Set)

The novel peroxide air curing formulations which consist of peroxide(s), bismaleimide coagents(s), sulfur donor—sulfur accelerator system can also include low levels of antioxidants. Previously, in Example 4, Table 4, run #11, (M. Niclate, i.e., Methyl Niclate) nickel dimethyldithiocarbamate was used at a low level of 0.2 phr, along with others, e.g., zinc (M. Zimate) and copper (M. Cumate) type dimethyldithiocarbamates along with Sulfads® to successfully produce a tack-free surface with good physical properties (compression set). The Methyl Niclate, whose chemical name is nickel dimethyldithiocarbamate, is sold as antioxidant.

In this present Example 14 and Table 14, a low level of 0.28 phr of Methyl Niclate is used in run #3 compared to a phenolic antioxidant and a sulfenamide accelerator, see run #6 MBPC (2,2'-methylene bis-4-methyl-6-butylphenol), and run #7, Santocure TBSI (N-t-butyl-2-benzothiazolesulfenimide). In each case HVA-2 and Sulfads are also included in the formulation, as per the present invention.

Methyl Niclate (nickel dimethyldithiocarbamate) with Sulfads (98% dipentamethylene thiuram tetrasulfide) or Morfax (98% 4-morpholinyl-2-benzothiazole disulfide) is an acceptable combination as per Table 14, nuns #2, #3 and #4. Substituting MBPC (2,2'-methylene bis-4-methylbutylphenol) or Santocure TBSI (N-t-butyl-2-benzothiazolesulfenemide) for Niclate (nickel dimethyldithiocarbamate) gives an excellent surface with desirable low compression set physical properties. Thus, low levels of phenolic antioxidants and sulfenamide class of accelerator work well with HVA-2 and low levels of other sulfur accelerators in the novel peroxide compositions of this invention. It is not obvious that low levels of these compounds would be effective, based on the teachings of the prior art. Examples of prior art formulations which use the acrylic coagent SR-206 (ethylene glycol dimethacrylate) are provided in table 14, run #9 and run #10, where much higher amounts of antioxidants, Vanox MBPC (99% 2,2'-methylene bis-4-methyl-6-t-butylphenol) and Vanox ZMTI (93% Zinc 2-mercapto-toluimidazole) appear to have a poor effect on the surface cure in this formulation, along with undesirable higher compression set values, particularly for run #10.

TABLE 14

| Royalene 521 EPDM | 100 |
| N660 Black | 75 |
| 2280 Oil | 20 |
| ZnO | 1 |
| Stearic Acid | 1 |

| Run# | 1 | 2 | 3 | 4 | 5 | 6 | 7 | 8 | 9 | 10 |
|---|---|---|---|---|---|---|---|---|---|---|
| DC40KEP | 7.5 | 6.0 | 5.0 | 5.0 | 5.0 | 5.0 | 5.0 | 6.0 | 6.0 | 6.0 |
| SR-206 | — | — | — | — | — | — | — | 2.0 | 2.0 | 2.0 |
| HVA-2 | — | 2.0 | 2.0 | 2.0 | 2.0 | 2.0 | 2.0 | — | — | — |
| Sulfads | — | 0.24 | 0.20 | — | — | 0.20 | 0.20 | — | — | — |
| Methyl Niclate | — | 0.24 | 0.28 | 0.28 | — | — | — | — | — | — |
| Morfax | — | — | — | 0.20 | 0.48 | — | — | — | — | — |
| TBSI | — | — | — | — | — | — | 0.28 | — | — | — |
| MBPC | — | — | — | — | — | 0.28 | — | — | — | 2.5 |
| ZMTI | — | — | — | — | — | — | — | — | 2.5 | — |
| MDR at 170° C. | | | | | | | | | | |
| $M_H$ | 26 | 31 | 29 | 28 | 28 | 29 | 30 | 26 | 26 | 13 |
| $T_{S1}$ | 0.47 | 0.50 | 0.51 | 0.42 | 0.43 | 0.55 | 0.54 | 0.74 | 0.73 | 1.44 |
| $T_{C90}$ | 7.2 | 4.1 | 3.7 | 3.8 | 3.9 | 3.9 | 4.1 | 7.1 | 6.7 | 11.6 |
| Cure in air at 400° F. for 12 min. | | | | | | | | | | |
| Surface | 10 | 1.5 | 2 | 2 | 4 | 1 | 1 | 10 | 8 | 10 |
| Compression set 150° C./70 hrs. | | | | | | | | | | |
| % Comp.Set | 16 | 16 | 16 | 15 | 19 | 17 | 19 | 14 | 22 | 49 |

Example 15

Crosslinking a Fully Saturated Elastomer (Ethylene-octene Copolymer)

An ethylene-octene (24%) copolymer G8100 from Dupont Dow, is cured with 2 levels of dicumyl peroxide with and without HVA-2—VULTAC® 5-Butyl Zimate in the rheometer and thin samples in hot air. This extended formulation is rubbery, but slightly thermoplastic and not sulfur curable.

In Table 15, run #3 and run #4 are only slightly tacky after curing which is a major improvement because most thermoplastic ethylene polymers would be very sticky in this test, simply because these polymers melt/soften at these temperatures. The oil is added to reduce stiffness but can make the surface more tacky. The oil can be left out at this low filler level. When cooled to room temperature, these samples (runs #3 & 4) were not tacky.

TABLE 15

Crosslinking a Fully Saturated Elastomer (Ethylene-Octene Copolymer)

| EG8100 | 100 |
| N 660 black | 60 |
| 2280 oil | 5 |
| ZnO | 3 |
| Stearic Acid | 1 |
| AgeRite MA | 0.5 |

| Run # | 1 | 2 | 3 | 4 |
|---|---|---|---|---|
| DC40P | 7.0 | 10.0 | 4.00 | 5.72 |
| HVA-2 | — | — | 1.50 | 2.14 |
| VULTAC 5 | — | — | 0.55 | 0.79 |
| B. Zimate | — | — | 0.25 | 0.36 |
| MDR at 170° C. | | | | |
| $M_H$ in lb | 22 | 30 | 30 | 37 |
| $T_{S.4}$ min | 0.43 | 0.39 | 0.49 | 0.44 |
| $T_{C90}$ min | 7.6 | 6.9 | 5.3 | 5.0 |

TABLE 15-continued

| Cured in air Surface tackiness rating | | | | |
|---|---|---|---|---|
| 420° F./8 min | 10 | 10 | 5 | 5 |
| 375° F./18 min | 10 | 10 | 4 | 4 |

Example 16

Evaluation of Different Bismaleimide Compounds for use in Novel Peroxide Formulations Which can Crosslink Elastomers With a Tack-free Surface in the Presence of Air In Table 16, several different bismaleimide compounds were evaluated in the practice of this invention. Unexpectedly, all of these bismaleimide compounds provided good crosslinking efficiency plus tack-free surfaces when tested immediately upon removal from a hot air cure profile of 410° F. for eight minutes. The various coagents were evaluated on an equivalent molar bases (taking into account the number of unsaturated functionality) compared to 2 phr of m-phenylene-bismaleimide (MBM). Structures for these various compounds are provided below:

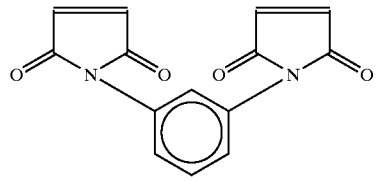

Abbreviation: MBM
N,N'-1,3-phenylene bismaleimide

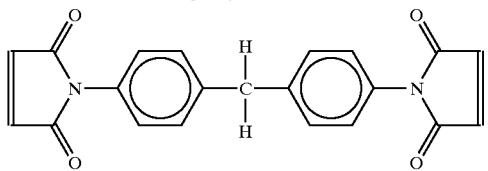

Abbreviation: MPBM
1-1'-(methylene-di-4,1-phenylene)bismaleimide

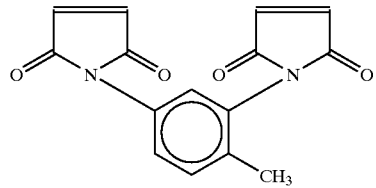

Abbreviation: MMBM
N,N'-(4-methyl-1,3-phenylene)bismaleimide

The rubber formulation which was used for these experiments is provided below:

| The rubber formulation | Parts |
|---|---|
| Keltan 2506 EPDM (DSM Copolymer) | 100 |
| N660 carbon black (Huber) | 75 |
| Sunpar 2280 (Sun Oil) | 15 |
| Peroximon DC40KEP | 5 |
| Coagent | Molar Equivalent to 2.0 phr of MBM* |
| Vanax A (®. T. Vanderbilt) | 0.2 |
| VULTAC 5 (Elf Atochem) | 0.7 |
| Durax (R.T. Vanderbilt) | 0.1 |

*Taking into account the number of unsaturated groups for each coagent compound.

TABLE 16

| Run # | 1 | 2 | 3 | 4 |
|---|---|---|---|---|
| Coagent Used | None § | MBM | MPBM | MMBM |
| Crosslinking DSM Copolymer Keltan 2506 EPDM in an MDR 2000E at 170° C., 1° arc | | | | |
| $M_L$ (lb-in) | 2.270 | 2.280 | 2.140 | 2.180 |
| $M_H$ (lb-in) | 34.90 | 32.47 | 27.51 | 30.08 |
| $M_H$-$M_L$ (min) | 32.63 | 30.19 | 25.37 | 27.90 |
| $T_{S\ 0.2}$ (min) | 0.310 | 0.330 | 0.370 | 0.345 |
| $T_{S\ 0.4}$ (min) | 0.350 | 0.370 | 0.430 | 0.390 |
| $T_{S\ 1.0}$ (min) | 0.440 | 0.465 | 0.550 | 0.490 |
| $T_{C90}$ (min) | 6.850 | 4.870 | 5.890 | 5.260 |

TABLE 16-continued

| Run # | 1 | 2 | 3 | 4 |
|---|---|---|---|---|
| Crosslinking in a hot air oven at 410° F. for 8 minutes | | | | |
| Surface Tack, 1–10 (10 worst) | 10 | 1 | 3 | 2 |
| % Compression Set @ 150° C./70 hours | — | 27 | 46 | 36 |

§Note:
When no coagent was used, 30% more dicumyl peroxide was used in the formulation in an attempt to reduce surface tack. However, even with the increase in peroxide for run #1, surface tack was very poor (10 out of 10).

After the MDR2000E testing was completed, the AIR Cure Surface Tack test was performed. All of the samples were heated in the press oven at 410° F. for eight minutes. After the eight minutes, the samples were removed and paper towels were pressed onto the hot samples. After cooling, the paper towel was removed at a uniform rate to check for tackiness. Note that after the hot air crosslinked samples had cooled to room temperature, there was very little tack on the surface (except for the control run #1 peroxide cure), with all samples having very similar, low surface tack. All of the samples also displayed their own foaming height, meaning each AIR Cured sample did internally foam to a certain degree. This is partially dependent on the low Mooney Viscosity EPDM used.

Example 17

Further Evaluations of Different Bismaleimide Compounds for Use in Novel Peroxide Formulations Which can Crosslink Elastomers With a Tack-free Surface in the Presence of Air The 1,2; 1,3 and 1,4 (ortho, meta, para) isomers of N,N'-phenylene bismaleimide were evaluated for use in novel peroxide compositions which allow crosslinking elastomers in the presence of air and provide a filly cured tack-free surface. The elastomer used in this present example is Nordel®IP EPDM NDR-4640. This is one of the new Dupont Dow metallocene type EPDM elastomers.

The various bismaleimide coagents performed well to provide a good tack free surface, as per Table 17, runs #5, #6 and #7, when used with low levels of select additives as per this invention. All of these novel compositions use a unique blend of sulfur containing additives (Sulfads®, VULTAC® 5 and Unads®) at low levels together with the bismaleimide coagent and peroxide.

Note that poor surface cure was obtained when the separate components of the peroxide formulations are used individually, see Table 17, runs #1, #2, #3, #4, and #8. Run #1 was the peroxide alone, runs #2, to #4 were the coagents and peroxide, run #8 was the peroxide and sulfur accelerator blend. In each case the surface of these formulations were tacky upon hot air cure at 400° F. cure.

TABLE 17

Crosslinking Nordel IP NDR-4640 EPDM in Hot Air Oven Evaluation of various bismaleimide compounds in the practice of this invention.

| Run# | 1 | 2 | 3 | 4 | 5 | 6 | 7 | 8 |
|---|---|---|---|---|---|---|---|---|
| DCKEP | 7.00 | 4.20 | 4.20 | 4.20 | 4.20 | 4.20 | 4.20 | 7.00 |
| 1,2 PDM | — | 2.10 | — | — | 2.10 | — | — | — |
| 1,3 PDM | — | — | 2.10 | — | — | 2.10 | — | — |
| 1,4 PDM | — | — | — | 2.10 | — | — | 2.10 | — |

TABLE 17-continued

Crosslinking Nordel IP NDR-4640 EPDM in Hot Air Oven Evaluation of various bismaleimide compounds in the practice of this invention.

| Run# | 1 | 2 | 3 | 4 | 5 | 6 | 7 | 8 |
|---|---|---|---|---|---|---|---|---|
| Sulfads | — | — | — | — | 0.28 | 0.28 | 0.28 | 0.28 |
| VULTAC 5 | — | — | — | — | 0.28 | 0.28 | 0.28 | 0.28 |
| Unads | — | — | — | — | 0.14 | 0.14 | 0.14 | 0.14 |
| MDR2000E 175° C., 1° arc | | | | | | | | |
| $M_H$ (lb-in) | 33.8 | 27.6 | 37.2 | 43.3 | 24.1 | 34.5 | 36.2 | 24.8 |
| $T_{S.4}$ (min) | 0.29 | 0.29 | 0.26 | 0.27 | 0.45 | 0.44 | 0.44 | 0.37 |
| $T_{C90}$ (min) | 4.59 | 5.26 | 3.06 | 2.94 | 4.59 | 3.26 | 5.18 | 4.22 |
| 140° C. | | | | | | | | |
| $M_L$ | 3.26 | 3.28 | 3.32 | 3.30 | 3.28 | 3.29 | 3.29 | 3.15 |
| $T_{S.4}$ | 2.01 | 2.04 | 1.79 | 1.99 | 3.37 | 3.32 | 3.29 | 2.67 |
| $T_{S.1}$ | 3.33 | 2.91 | 2.39 | 2.72 | 4.85 | 4.76 | 4.78 | 3.97 |
| 195° C. | | | | | | | | |
| $M_H$ | 30.5 | 23.5 | 34.1 | 39.7 | 20.5 | 31.7 | 34.2 | 22.7 |
| $M_L$ | 2.47 | 2.45 | 2.71 | 2.63 | 2.14 | 2.14 | 2.16 | 2.19 |
| $T_{S.4}$ | 0.19 | 0.20 | 0.17 | 0.17 | 0.26 | 0.25 | 0.25 | 0.22 |
| $T_{C90}$ | 1.01 | 1.08 | 0.75 | 0.75 | 1.00 | 0.81 | 1.09 | 0.96 |
| Hot Air Cure @ 400° F. at 12 minutes | | | | | | | | |
| Tacky Surface Rating | 10 | 8 | 8 | 8 | 4 | 1 | 3 | 10 |
| Hardness | 60 | 60 | 62 | 65 | 60 | 62 | 62 | 58 |

Formulation:
Nordel 4640   100
N 774   80
N 990   20
Sunpar 2280   25
ZnO   1
Stearic Acid   1
Surface Tackiness Ratings
1 no, 4 slight, 7 moderate, 10 yes
PDM = N,N-(1,2 or 1,3 or 1,4)-phenylenedimaleimide

Example 18

Further Evaluation of Various Bismaleimide Compounds in the Practice of this Invention Table 18 shows the results of the evaluation of four coagent bismaleimide compounds for their effectiveness to provide a cured elastomer with tack-free surface upon curing in a hot air oven, when used with peroxides and select low levels of sulfur accelerators, as per the practice of this present invention. In this example, Dupont Dow Nordel IP NDR-4640 metallocene EPDM was chosen as the elastomer for evaluation work.

The monomeric compounds are: 1,1'(3,3-dimethyl-1,1'-biphenyl-4,4'-diyl)-bismaleimide; N,N-(1,1'-biphenyl-4,4'-bismaleimide; 1,2-bismaleimidoethane and 1,6bismaleimidohexane. They were compared no N,N'-1,3-phenylenebismaleimide or Vanax MBM, in Table 18. Using our preferred formulation consisting of dicumyl peroxide, Sulfads, VULTAC 5 and Unads, unexpectedly we found that the various bismaleimide coagents provided excellent tack-free surfaces, Table 18, run #2 to run #6, compared to the peroxide control run #1 which provided a very sticky surface.

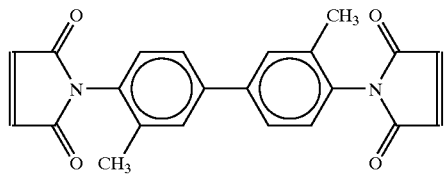

Abbreviation: DMBPDM
1,1'(3,3-dimethyl-1,1'-biphenyl-4,4'-diyl)-bismaleimide

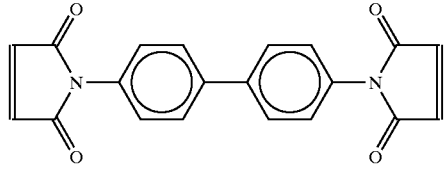

Abbreviation: BPDB
N,N'-(1,1'-biphenyl-4,4'-diyl)-bismaleimide

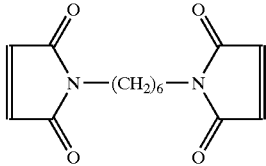

Abbreviation: BH
1,6-bismaleimidohexane

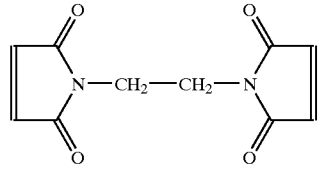

Abbreviation: BE
1,2-bismaleimidoethane

TABLE 18

Air Cure - Nordel NDR 4640 - Coagent Blend Study

| Run # | 1 | 2 | 3 | 4 | 5 | 6 |
|---|---|---|---|---|---|---|
| DC 40 KEP | 7.00 | 5.00 | 5.00 | 5.00 | 5.00 | 5.00 |
| Vanax MBM | — | 1.50 | 1.00 | 1.00 | 1.00 | 1.00 |
| DMBPDB | — | — | — | 0.25 | — | — |
| BPDP | — | — | — | 0.25 | — | — |
| BE | — | — | — | — | 0.50 | — |
| BH | — | — | — | — | — | 0.50 |
| Sulfads | — | 0.28 | 0.28 | 0.28 | 0.28 | 0.28 |
| VULTAC 5 | — | 0.48 | 0.48 | 0.48 | 0.48 | 0.48 |
| Unads | — | 0.14 | 0.14 | 0.14 | 0.14 | 0.14 |
| MDR2000E 175° C. | | | | | | |
| $M_H$ (in-lb) | 44.0 | 40.8 | 36.9 | 40.1 | 40.2 | 39.8 |
| $T_{S.4}$ min | 0.27 | 0.38 | 0.38 | 0.38 | 0.39 | 0.39 |
| $T_{C90}$ | 4.53 | 3.05 | 3.15 | 3.51 | 3.20 | 3.07 |
| MDR 195° C. | | | | | | |
| $M_H$ | 40.2 | 38.0 | 34.3 | 37.0 | 36.6 | 36.9 |
| $M_L$ | 2.94 | 2.62 | 2.55 | 2.60 | 2.57 | 2.60 |
| $T_{S.4}$ | 0.18 | 0.13 | 0.13 | 0.22 | 0.22 | 0.13 |
| $T_{C90}$ | 1.02 | 0.79 | 0.80 | 0.83 | 0.78 | 0.79 |
| MDR 140° C. | | | | | | |
| $M_L$ | 3.85 | 3.95 | 3.81 | 3.91 | 3.90 | 3.85 |
| $T_{S.4}$ | 1.74 | 2.86 | 2.85 | 2.83 | 2.82 | 2.79 |

TABLE 18-continued

Air Cure - Nordel NDR 4640 - Coagent Blend Study

| Run # | 1 | 2 | 3 | 4 | 5 | 6 |
|---|---|---|---|---|---|---|
| Evaluation of the surface of crosslinked EPDM, cured in a hot air oven at 400° F. for 8 to 12 minutes. Tackiness rating 1 to 10; 10 sticky surface ||||||| 
| 8 minutes | 10 | 2.5 | 4 | 2.5 | 3 | 4 |
| 12 minutes | 10 | 1 | 2.5 | 1 | 1 | 1 |
| Shore | 65 | 67 | 66 | 66 | 66 | 66 |
| Formulation: | Nordel 4640 | 100 | DMBPDB: 1,1'(3,3-dimethyl- |||| 
| | N 774 | 60 | 1,1'-biphenyl-4,4-diyl)-bismaleimide |||| 
| | N 990 | 60 | BPDB: N,N'-(1,1'-biphenyl-4,4'-diyl)-bismaleimide |||| 
| | 2280 | 20 | BE: 1,2-bismaleimidoethane |||| 
| | ZnO | 1 | BH: 1,6-bismaleimidohexane |||| 
| | Stearic Acid | 1 | ||||

Example 19

Evaluation of 2-(2,4-cyclopentadien-1-ylidene)-1,3-dithiolane as an Additive for Use in a Novel Peroxide Formulation, for Use in the Crosslinking of Elastomers in Hot Air Ovens to Provide a Good Surface Cure (Tack-free Surface) With Good Physical Properties An unsaturated sulfur containing compound was evaluated in combination with a bismaleimide coagent and peroxide. The compound 2-(2,4-cyclopentadien-1-ylidene)-1,3-dithiolane was substituted for the blend of Durax, Vanax A and VULTAC 5 which was used in combination with N,N'-m-phenylene bismaleimide (HVA-2) coagent and dicumyl peroxide, as per the data in table 19, this unique formulation provided efficient crosslinking with an excellent tack-free surface upon hot air cure at 410° F. for eight minutes.

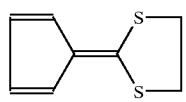

2-(2,4-cyclopentadien-1-ylidene)-1,3-dithiolane

In addition to the good crosslinking performance in the presence of air, thus overcoming the air (oxygen) inhibition, it was found that the final crosslinked elastomer had excellent final physical properties, based on the flu desirable, low percent compression set number which was obtained after heat aging the crosslinked EPDM for 70 hours at 150° C.

TABLE 19

| Run # | 1 | 2 |
|---|---|---|
| DSM 2506 EPDM | 100 | 100 |
| N660 Carbon black | 75 | 75 |
| Sunpar 2280 | 15 | 15 |
| Dicumyl Peroxide 40% on clay | 5 | 5 |
| N,N'-m-phenylene bismaleimide | 2 | 2 |
| Vanax A | 0.2 | — |
| VULTAC 5 | 0.7 | — |
| Durax | 0.1 | — |
| 2-(2,4-cyclopentadiene-1-ylidene)-1,3-dithiolane | — | 1.0 |

TABLE 19-continued

| Run # | 1 | 2 |
|---|---|---|
| MDR2000E at 170° C., 1° arc ||| 
| $M_H - M_L$ (in-lbs) | 32 | 30 |
| $T_{S4}$ mm | 0.36 | 0.34 |
| $T_{C90}$ | 5.23 | 5.44 |
| Hot Air Cure at 400° F. ||| 
| Tacky Surface Rating | 2 | 1 |
| % Compression set, 150° C., 70 hrs. | 27% | 14% |

Example 20

Use of Polysulfide in Combination With Select Halogenated Polymers or Silicone Rubber, Used as Additives With Peroxide, Sulfur Accelerators and Bismaleimide Coagents, to Introduce a Tack-free Surface in Highly Extended EPDM Formulations Nordel IP 4520 (Dupont Dow Elastomers) blended with equal weight of carbon black and high levels of oil would be difficult to cure with ordinary peroxides and is representative of a sulfur cured hose compound formulation. The highly extended EPDM formulations where carbon black and or oil levels are nearly the same as the EPDM usage, represents a formulation which is difficult to cure well with organic peroxides. When curing a highly filled EPDM in the presence of air, the peroxide radicals will attack the oil and carbon black as if it were rubber, so obtaining a good level of cure and maintaining a tack-free surface in the presence of air is very difficult.

Using our novel blend of sulfur accelerators and bismaleimide, we also incorporated small amounts of (FA) polysulfide polymer and (SE6160) silicone rubber as novel additives for use in our invention. We found that the blend of polysulfide polymer and silicone rubber or chlorinated polyethylene or hypalon (chlorosulfonated polyethylene) with peroxide, bismaleimide coagent and low levels of select sulfur accelerators will produce a suitably tack-free cured surface in the presence of air. So this novel blend provides a means to cure these highly extended EPDM formulation which are commonly cured with sulfur vulcanization. Note that the various sulfur vulcanization systems used in the art, are not sensitive to higher concentrations of oil and carbon black and are capable of fully curing highly extended rubber formulations.

Thus we envision that a polymeric masterbatch of peroxide, select sulfur accelerators, bismaleimide coagent, polysulfide could be prepared wherein chlorinated polyethylene and or chlorosulfonated polyethylene could be incorporated as additional additives, as part of our invention.

Note the use of silicone rubber without the polysulfide polymer produces a moderately tacky surface. Use of a fluoroelastomer as an additive in our invention in combination with polysulfide does not produce a suitable surface.

TABLE 20

AIR Cure - Nordel IP 4520 - Effect of Polymer Additives

| | 1 | 2 | 3 | 4 | 5 | 6 |
|---|---|---|---|---|---|---|
| 4520 EPDM | 100 | 100 | 100 | 100 | 100 | 100 |
| N660 | 100 | 100 | 100 | 100 | 100 | 100 |
| N990 | 60 | 60 | 60 | 60 | 60 | 60 |
| LW 150 oil | 60 | 60 | 60 | 60 | 60 | 60 |
| stearic acid | 0.50 | 0.5 | 0.50 | 0.50 | 0.50 | 0.50 |

TABLE 20-continued

AIR Cure - Nordel IP 4520 - Effect of Polymer Additives

|  | 1 | 2 | 3 | 4 | 5 | 6 |
|---|---|---|---|---|---|---|
| DCKE 40% | 10.0 | 8.0 | 8.0 | 8.0 | 8.0 | 8.0 |
| MBM | — | 1.35 | 1.35 | 1.35 | 1.35 | 1.35 |
| Vanax A | — | 0.15 | 0.15 | 0.15 | 0.15 | 0.15 |
| VULTAC 5 | — | 0.45 | 0.45 | 0.45 | 0.45 | 0.45 |
| Durax | — | 0.05 | 0.05 | 0.05 | 0.05 | 0.05 |
| Polysulfide | — | — | 1 | 1 | 1 | 1 |
| Silicone Rubber | — | 4.00 | 4.00 | — | — | — |
| CPE | — | — | — | 4.00 | — | — |
| Hypalon | — | — | — | — | 4.00 | — |
| Fluoroelas. | — | — | — | — | — | 4.00 |
| RPA 170 C, 0.2° arc, 60 cpm | | | | | | |
| Max S' inlb | 4.57 | 5.66 | 5.82 | 6.41 | 7.61 | 5.94 |
| $T_{S.5}$ | 0.64 | 0.46 | 0.44 | 0.41 | 0.35 | 0.46 |
| $T_{C90}$ | 7.46 | 4.36 | 4.69 | 4.89 | 3.88 | 4.63 |
| Surface | Tacky | MOD | SLI | NO | NO | MOD |

Surface:
TACKY - very sticky; SLI = only slightly tacky; NO = no tack; MOD = moderate tack

Example 21

In This Example we Show More Data for Curing, the "Difficult to Cure by Peroxide" Highly Filled EPDM Formulations In this particular formulation we use more carbon black (a total of 180 parts) than EPDM rubber (used at a total of 100 parts). The use of the novel blend of peroxide, MBM and select sulfur accelerators (listed as blend 1) provides a good surface (run 2) when crosslinking in the presence of air, compared to the standard peroxide (run 1) and at a lower overall curative concentration. Again this is a highly filled EPDM formulation which is very difficult to cure with organic peroxides. One skilled in the art would not consider such a formulation for use with organic peroxides, and would only use sulfur vulcanization cure systems.

When crosslinking in the presence of hot air, further improvement in surface cure was attained when using a small amount of a chlorosulfonated polyethylene (Hypalon—from Dupont Dow) as a novel additive to be used in the practice of our invention (run 3). Further improvements in surface cure were noted when the blend of polysulfide and Hypalon (run 4) were used as novel polymeric additives in the practice of our invention.

TABLE 21

Use of Chlorosulfonated Polyethylene and Polysulfide as novel additives to crosslink a highly filled EPDM in the presence of air to provide a tack-free surface using organic peroxides

|  | 1 | 2 | 3 | 4 |
|---|---|---|---|---|
| DCKEP | 15.00 | — | 4.00 | 4.00 |
| Blend 1 | — | 10.00 | 8.00 | 8.00 |
| AgeRite MA | — | — | — | — |
| MTBHQ | — | — | — | — |
| *Hypalon 40 | — | — | 5.00 | 5.00 |
| Polysulfide | — | — | — | 1.00 |

TABLE 21-continued

Use of Chlorosulfonated Polyethylene and Polysulfide as novel additives to crosslink a highly filled EPDM in the presence of air to provide a tack-free surface using organic peroxides

|  | 1 | 2 | 3 | 4 |
|---|---|---|---|---|
| RPA cure at 170 C, 0.2 degree arc, 60 cpm | | | | |
| Max S' in-lbs | 5.77 | 6.75 | 8.72 | 8.32 |
| $T_{S.5}$ min | 0.42 | 0.53 | 0.35 | 0.35 |
| $T_{C90}$ min | 6.07 | 4.41 | 3.46 | 3.69 |
| Hot Air Cure at 400 F for 8 to 12 minutes | | | | |
| Surface Tack: | Tacky | Slight | Very Slight | None |
| Rubber Formulation | | Blend 1 | | |
| 4570 EPDM | 80* | | DCKE | 60% |
| 4770 EPDM | 20 | | MBM | 27% |
| N 660 | 120 | | Vanax A | 3% |
| N 990 | 60 | | VULTAC 5 | 9% |
| LW 150 | 80 | | Durax | 1% |
| Stearic acid | 0.8 | | | |

*a small portion of Hypalon (amount listed above) replaces an equal amount of 4570 EPDM

Example 22

In This Example We Illustrate Several New Chemical and Polymeric Additives Which are Useful in Developing a Peroxide Formulation for Crosslinking Elastomers in the Presence of Hot Air In particular these are: Vanax 6H (N-cyclohexyl-N'-phenyl-p-phenylenediamine) CAS 101-87-1, an antiozonant for diene based polymers; Polysulfide (PTE) and silicone rubber (VMQ).

Vanax 6H (R. T. Vanderbilt)

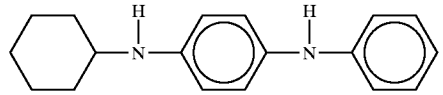

We show that the antiozonant serves as a replacement for the sulfur containing compounds in the practice of this invention. The invention contemplates such substitution of this antioxidant and those of similar structure as full equivalent to the other compounds included within the scope of the definition of compound (B). In addition polysulfide (PTE) also serves this same purpose.

Lastly, by an unexpected blend of two polymers PTE and VMQ as polymeric additives one can produce a tack-free surface with peroxides in the presence of hot air. Note no bismaleimide and sulfur compounds or antiozonant additives were used.

TABLE 22

Crosslinking Royalene 501 EPDM
Use of polysulfide and silicone rubber as well as the use of an antiozonant N-cyclohexyl-N'-phenyl-p-phenylene diamine (Vanax 6H).
Basic Elastomer Formulation:
100 parts of Royalene 501 EPDM, 70 parts N550 carbon black,
30 parts N-990 carbon black, 20 parts Sunpar LW150 oil,
1 part zinc oxide, 1 part stearic acid

| Additive | 1 | 2 | 3 | 4 | 5 | 6 | 7 |
|---|---|---|---|---|---|---|---|
| DCP 40KE | 7.5 | 4.6 | 4.6 | 4.6 | 4.6 | 4.6 | 7.5 |
| MBM | — | 2.2 | 2.2 | 2.2 | 2.2 | 2.2 | — |
| Vanax A | — | — | 0.7 | — | — | — | — |
| Vanax 6H | — | — | — | 0.7 | — | — | — |
| Polysulfide | — | — | — | — | 0.7 | 2.2 | 3.0 |
| VMQ | — | — | — | — | — | — | 7.0 |
| Crosslinking using an MDR 2000E 175° C., 1° arc | | | | | | | |
| $M_H$ (in-lbs) | 35.6 | 37.8 | 40.1 | 36.1 | 33.3 | 36.0 | 27.7 |
| $T_{S0.4}$ (min) | 0.3 | 0.26 | 0.29 | 0.34 | 0.26 | 0.26 | 0.30 |
| $T_{C90}$ (min) | 4.39 | 2.98 | 3.46 | 3.63 | 2.51 | 2.89 | 3.98 |
| Hot Air Cure at 400° F. (8 to 12 minutes) | | | | | | | |
| Tacky Surface (tested hot) | Yes | Yes | No | No | No | No | No |

Example 23

Examples of Using Various Other Dialkyl Type Peroxides

In this example we crosslink a metallocene based EPDM (Nordel IP 4640) using different organic peroxides. Note that in each case the peroxide without the various additives, was not able to provide a tack-free surface when crosslinking the EPDM elastomer formulation in the presence of hot air. The peroxides listed in Table 23 are:

| Peroxide | Chemical Name |
|---|---|
| Lup 101 | 2,5-dimethyl-2,5-Di(t-butylperoxy)hexane |
| MTBPP | 4-methyl-4-(t-butylperoxy)-2-pentanone |
| Luperox F/R | Di(t-butylperoxy) diisopropyl benzene |
| DAPDIB | Di(t-amylperoxy) diisopropyl benzene |

This example is provided to illustrate that other dialkyl peroxides can be used in thee practice of this invention, besides the most commonly used dialkyl peroxide, dicumyl peroxide, which was extensively evaluated in the previous examples.

TABLE 23

Use of other Dialkyl Peroxides for Hot Air Cure Crosslinking of Nordel IP 4640 EPDM

| | 1 | 2 | 3 | 4 | 5 | 6 | 7 | 8 |
|---|---|---|---|---|---|---|---|---|
| Nordel 4640 | 100 | 100 | 100 | 100 | 100 | 100 | 100 | 100 |
| N330 | 60 | 60 | 60 | 60 | 60 | 60 | 60 | 60 |
| N990 | 40 | 40 | 40 | 40 | 40 | 40 | 40 | 40 |
| LW150 | 35 | 35 | 35 | 35 | 35 | 35 | 35 | 35 |
| ZnO | 1 | 1 | 1 | 1 | 1 | 1 | 1 | 1 |
| Stearic Acid | 1 | 1 | 1 | 1 | 1 | 1 | 1 | 1 |
| Lup 101 92.8% | 3.60 | 2.20 | — | — | — | — | — | — |
| MTBPP 84.4% | — | — | 4.90 | 3.00 | — | — | — | — |
| Luperox F/R | — | — | — | — | 3.60 | 2.20 | — | — |
| DAPDIB 79.7% | — | — | — | — | — | — | 4.90 | 3.00 |
| Vanax MBM | — | 2.40 | — | 2.40 | — | 2.40 | — | 2.40 |
| Sulfads | — | 0.32 | — | 0.32 | — | 0.32 | — | 0.32 |
| Vultac 5 | — | 0.32 | — | 0.32 | — | 0.32 | — | 0.32 |
| Unads | — | 0.16 | — | 0.16 | — | 0.16 | — | 0.16 |
| Crosslinking using an MDR2000E @ 200° C. 1° arc | | | | | | | | |
| $M_H$ | 27.4 | 30.9 | 21.1 | 30.7 | 32.7 | 34.9 | 26.3 | 29.9 |
| $T_{S.4}$ | 0.18 | 0.24 | 0.19 | 0.24 | 0.17 | 0.22 | 0.17 | 0.21 |
| $T_{C90}$ | 1.07 | 0.76 | 1.16 | 0.85 | 0.91 | 0.72 | 0.79 | 0.58 |
| HOT AIR Cure @ 400° F.; Surface Tack Rating | | | | | | | | |
| Tacky Surface? (Tested hot) | Yes | No | Yes | No | Yes | No | Yes | No |

| Peroxide | Chemical Name |
|---|---|
| Lup 101 | 2,5-dimethyl-2,5-Di(t-butylperoxy)hexane |
| MTBPP | 4-methyl-4-(t-butylperoxy-2-pentanone |
| Luperox F/R | Di(t-butylperoxy) diisopropyl benzene |
| DAPDIB | Di(t-amylperoxy) diisopropyl benzene |

One of skill in the art will also recognize that the compositions of the inventions may also be formulated as masterbatches for convenience in handling and compounding into the polymers for crosslinking in the presence of molecular oxygen Typical masterbatch carriers include, for example, microcrystalline wax, polycaprolactone, Ethylene propylene diene monomers polymers (EPDM), ehylene propylene monomers polymers (EPM), ethylene vinyl alcohol polymer (EVA), polyethylene (PE), or mixtures thereof.

We claim:

1. A composition consisting essentially of crosslinkable components useful for providing low compression set, surface tack free thermoset polymers by curing with free radical initiators in the presence of air, the components comprising:

(a) At least one compound (A) having the formula (I);

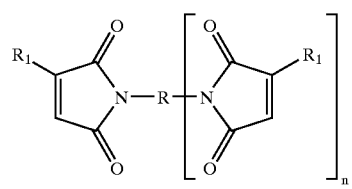

Wherein n is 1, R is divalent, or trivalent and is selected from the group consisting of cyclic aliphatic groups having from about 2 to 16 carbon atoms, cyclic aliphatic groups having from about 5 to 20 carbon atoms, aromatic groups having from about 6 to 18 carbon atoms and alkyl aromatic groups having from about 7 to 24 carbon atoms and wherein the divalent or trivalent groups may contain one or more heteroatoms selected from O, N and S, replacing a carbon atom, or carbon atoms and each $R^1$ is identical and is hydrogen or an alkyl group of 1 to 18 carbon atoms;

(b) At least one compound (B) selected from the group consisting of sulfur containing organic compounds capable of accelerating sulfur vulcanization of a polymer capable of being crosslinked by sulfur, polysulfide polymers and mixtures of said sulfur containing compounds;

(c) A free radical initiator (C) selected from the group consisting of organic peroxides and azo initiators; and (d) a compound selected from the group consisting of chloronated polyethylene and chlorosulfonated polyethylene.

2. A composition consisting essentially of crosslinking components useful for providing low compression set, surface tack free thermoset polymers by curing with free radical initiators in the presence of air, the components comprising:

(a) At least one compound (A) having the formula (I):

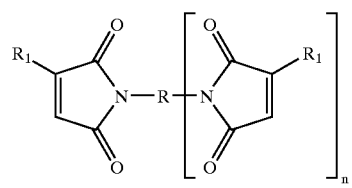

Wherein n is 1, R is divalent, or trivalent and is selected from the group consisting of cyclic aliphatic groups having from about 2 to 16 carbon atoms, cyclic aliphatic groups having from about 5 to 20 carbon atoms, aromatic groups having from about 6 to 18 carbon atoms and alkyl aromatic groups having from about 7 to 24 carbon atoms, and wherein the divalent, or trivalent groups may contain one or more heteroatoms selected from O, N and S, replacing a carbon atom, or carbon atoms and each $R^1$ is identical and is hydrogen or an alkyl group of 1 to 18 carbon atoms;

(b) At least one compound (B) selected from the group consisting of 4,4-dithiomorpholine, acyclicalkyl-2-benzothiazole sulfenamides, cyclicalkyl-2-benzothiazole sufenamides, aryl-2-benzothizole sulfenamides, alkylphenol disulfides and mixtures thereof; and (c) A free radical initiator (C) selected from the group consisting of organic peroxides and azo initiators.

3. A Composition as defined in claim 2 wherein compound (C) is selected from dialkyl peroxides or peroxyketals.

4. A composition as defined in claim 2 comprising dicumylperoxide, N,N-diphenylenebismaleimide, 4,4-dithiomorpholine, alkylphenoldisulfide and N-cyclohexyl-2-benzothiole sulfenamide.

5. A composition comprising dicumylperoxide, N,N-diphenylenebismaleimide, dipentamethylene thiuram tetrasulfide, alkylphenoldisulfide and tetramethylthiuram monosulfide.

6. A composition comprising dicumylperoxide, N,N-diphenylenebismaleimide, dipentamethylenethiuram tetrasulfide, alkylphenol disulfide and N-t-butyl-benzothiazole-2-sulfenamide.

7. A composition comprising a) at least one compound (A) having the formula (I):

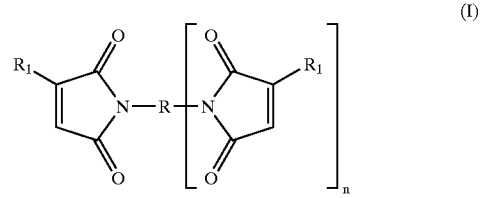

wherein n is 1, R is divalent or trivalent and is selected from the group consisting of cyclic aliphatic groups having from about 2 to 16 carbon atoms, cyclic aliphatic groups having from about 5 to 20 carbon atoms, aromatic groups having from about 6 to 18 carbon atoms and alkyl aromatic groups having about 7 to 24 carbon atoms, and wherein the divalent, or trivalent groups may contain one or more heteroatoms selected from O, N and S, replacing a carbon atom, or carbon atoms and each $R^1$ is identical and is hydrogen or an alkyl group of 1 to 18 carbon atoms; and (b) At least one compound (B) selected from the group consisting of sulfur containing organic compounds capable of accelerating sulfur vulcanization of a polymer capable of being crosslinked by sulfur, polysulfide polymers and mixtures of said sulfur containing compounds, which composition is formulated as a masterbatch on a carrier selected from the group consisting of microcrystalline wax, polycaprolactone, EPMD, EPM, EVA, PE and mixtures thereof.

8. A composition consisting essentially of crosslinkable components useful for providing low compression set, surface tack free thermoset polymers by curing with free radical initiators in the presence of air, the components comprising:

(a) At least one compound (A) having the formula (I):

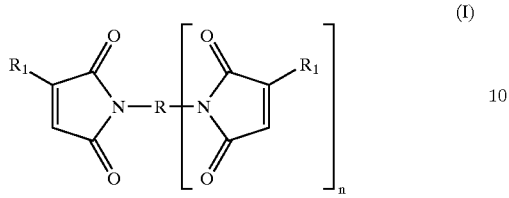

Wherein n is 1, R is divalent or trivalent and is selected form the group consisting of cyclic aliphatic groups having from about 5 to 20 carbon atoms, aromatic groups having from about 6 to 18 carbon atoms and alkyl aromatic groups having from about 7 to 24 carbon atoms, and wherein the divalent, or trivalent groups may contain one or more heteroatoms selected from O, N and S, replacing a carbon atom, or carbon atoms and each $R^1$ is identical and is hydrogen or an alkyl group of 1 to 18 carbon atoms, (b) At least one compound (B) selected from the group consisting of sulfur containing organic compounds capable of accelerating sulfur vulcanization of a polymer capable of being crosslinked by sulfur, polysulfide polymers and mixtures of said sulfur containing compounds; and (c) A free radical initiator (C) selected from the group consisting of organic peroxides and azo initiators which composition is formulated as a masterbatch on a carrier selected from the group consisting of microcrystalline wax, polycaprolactone, EPDM, EPM, EVA, PE and mixtures thereof.

* * * * *